US012671713B1

(12) United States Patent
Allard et al.

(10) Patent No.: US 12,671,713 B1
(45) Date of Patent: Jun. 30, 2026

(54) UTILIZING A MULTI-LAYER SECURITY ARCHITECTURE FOR AGENT REINFORCEMENT FINE-TUNING OF A MACHINE LEARNING MODEL

(71) Applicant: OpenAI OpCo, LLC, San Francisco, CA (US)

(72) Inventors: John Allard, San Francisco, CA (US); James Blomo, San Carlos, CA (US); Filipe de Avila Belbute Peres, San Francisco, CA (US); William Hang, San Francisco, CA (US); Joseph Palermo, San Francisco, CA (US); Chaitanya Ravuri, Saratoga, CA (US); Theophile Sautory, San Francisco, CA (US); Karan Sharma, San Francisco, CA (US); Beining Zhou, Stanford, CA (US); Wenjie Zi, San Francisco, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 19/362,129

(22) Filed: Oct. 17, 2025

(51) Int. Cl.
| | |
|---|---|
| *H04L 29/06* | (2006.01) |
| *G06N 3/092* | (2023.01) |
| *H04L 9/40* | (2022.01) |

(52) U.S. Cl.
CPC ......... *H04L 63/1433* (2013.01); *G06N 3/092* (2023.01); *H04L 63/0428* (2013.01)

(58) Field of Classification Search
CPC . H04L 63/1433; H04L 63/0428; H04L 63/02; H04L 63/0227; H04L 63/0281;
(Continued)

(56) References Cited

U.S. PATENT DOCUMENTS

| | | | |
|---|---|---|---|
| 12,282,545 B1 * | 4/2025 | Narayanaswamy ... | G06N 20/00 |
| 12,284,222 B1 * | 4/2025 | Yang ................... | H04L 63/1433 |

(Continued)

OTHER PUBLICATIONS

Junwei Liao, Muning Wen, Jun Wang, Weinan Zhang. "MARFT: Multi-Agent Reinforcement Fine-Tuning", 42 pages, arXiv preprint arXiv:2504.16129v4, Nov. 3, 2025.

(Continued)

*Primary Examiner* — Malcolm Cribbs
(74) *Attorney, Agent, or Firm* — Keller Preece PLLC

(57) ABSTRACT

The present disclosure relates to systems, non-transitory computer-readable media, and methods for utilizing a reinforcement fine-tuning pipeline to fine tune an agent machine learning (ML) model utilizing user-defined grader endpoints and/or external tools with a multi-layer security architecture. For example, the disclosed systems can utilize a multi-layer security architecture to filter incoming training datasets, perform content refusal checks, chain-of-thought leak detections, and/or governance oversights prior to training the agent ML model, during active training of the agent ML model using external tools and/or grader models, and/or during post-training of the agent ML model (prior to releasing a fine-tuned snapshot of the model). In addition, the disclosed systems can generate stateful trajectory rollouts to associate training trajectories of the agent machine learning model to unique identifiers to facilitate multiple environments and/or tasks to run concurrently while maintaining consistency across external tool calls and grading interactions during training.

20 Claims, 18 Drawing Sheets

(58) Field of Classification Search
 CPC ..... H04L 63/14; H04L 63/1408; G06N 3/092;
 G06F 21/606
 See application file for complete search history.

(56) References Cited

U.S. PATENT DOCUMENTS

| | | | |
|---|---|---|---|
| 2024/0388571 A1* | 11/2024 | Hanes | G06F 21/6245 |
| 2025/0111073 A1* | 4/2025 | Ho | G06F 21/6218 |
| 2025/0259075 A1* | 8/2025 | Crabtree | G06N 3/092 |
| 2025/0330490 A1* | 10/2025 | Agarwal | H04L 63/1466 |
| 2025/0356026 A1* | 11/2025 | Myers | G06F 21/552 |
| 2025/0363743 A1* | 11/2025 | El-Mokadem | G06T 17/20 |
| 2025/0373656 A1* | 12/2025 | Jeevagunta | H04L 63/1458 |

OTHER PUBLICATIONS

Weizhen Li et al., "Chain-of-Agents: End-to-End Agent Foundation Models via Multi- Agent Distillation and Agentic RL", 51 pages, arXiv preprint arXiv:Aug. 6, 2025.

* cited by examiner

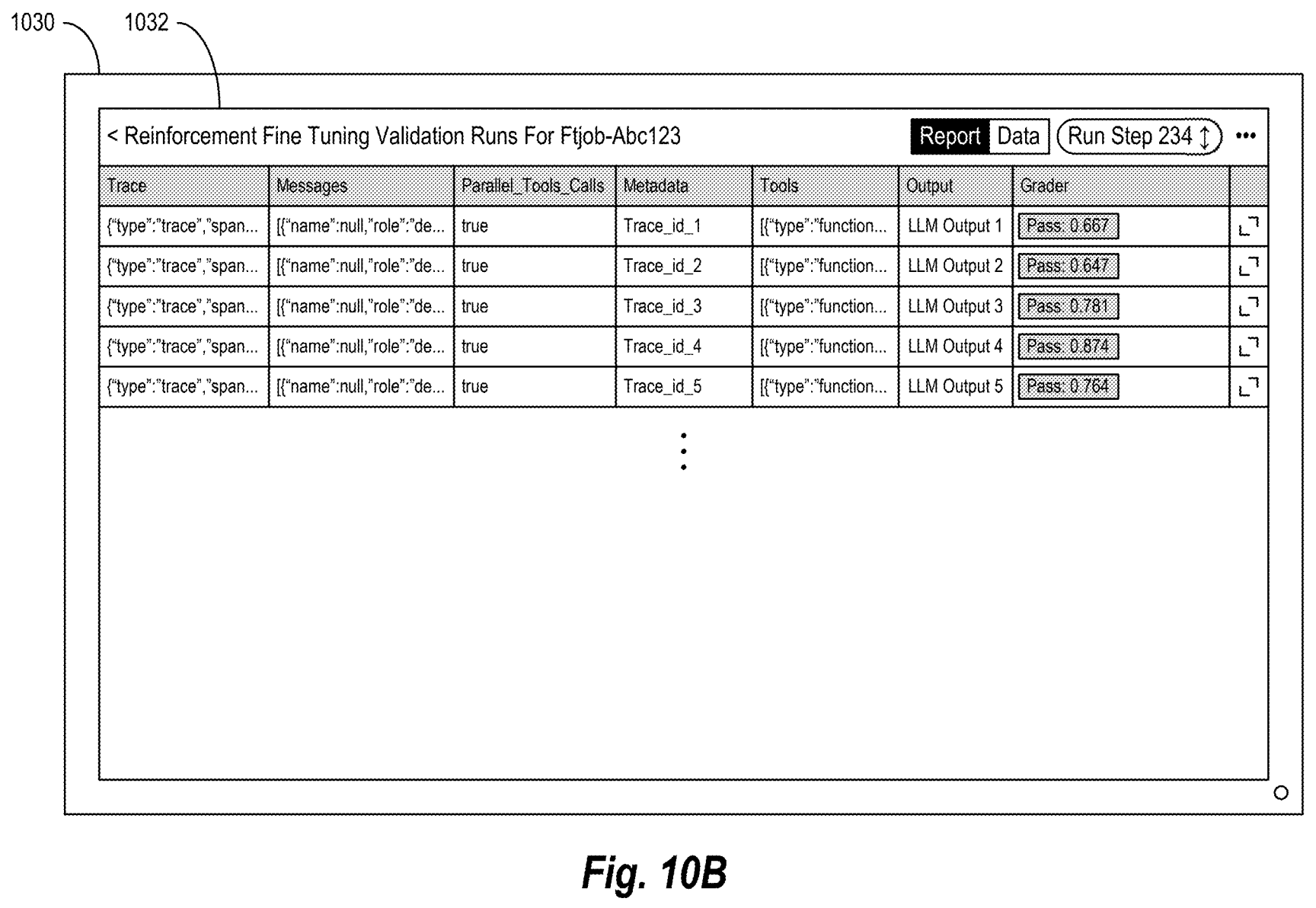

| Trace | Messages | Parallel_Tools_Calls | Metadata | Tools | Output | Grader |
|---|---|---|---|---|---|---|
| {"type":"trace","span... | [{"name":null,"role","de... | true | Trace_id_1 | [{"type":"function... | LLM Output 1 | Pass: 0.667 |
| {"type":"trace","span... | [{"name":null,"role","de... | true | Trace_id_2 | [{"type":"function... | LLM Output 2 | Pass: 0.647 |
| {"type":"trace","span... | [{"name":null,"role","de... | true | Trace_id_3 | [{"type":"function... | LLM Output 3 | Pass: 0.781 |
| {"type":"trace","span... | [{"name":null,"role","de... | true | Trace_id_4 | [{"type":"function... | LLM Output 4 | Pass: 0.874 |
| {"type":"trace","span... | [{"name":null,"role","de... | true | Trace_id_5 | [{"type":"function... | LLM Output 5 | Pass: 0.764 |

< Reinforcement Fine Tuning Validation Runs For Ftjob-Abc123

Report  Data  (Run Step 234 ↕)

*Fig. 10B*

Receiving A Training Prompt For An Agent Model *1102*

Generating An Agent Output By Calling A Digital Tool Through A Secure Proxy Architecture *1104*

Determining Security Vulnerability Checks For Interactions With Digital Tool *1106*

Updating Parameters Of The Agent Model Based On The Agent Output *1108*

1300

UTILIZING A MULTI-LAYER SECURITY ARCHITECTURE FOR AGENT REINFORCEMENT FINE-TUNING OF A MACHINE LEARNING MODEL

BACKGROUND

Recent years have seen significant development in training and utilizing machine learning models. More specifically, advancements in large language models (LLMs) allow LLMs to engage with users in natural dialogue. Indeed, the users and developers increasingly utilize machine learning models, such as LLMs, over the internet to access for inference or to modify the machine learning models. For instance, many existing artificial intelligence (AI) management systems deploy and enable access to LLMs (or other machine learning models) such that users can access the models over the internet. In many cases, existing AI management systems sometimes enable users to utilize tools to fine tune the machine learning models. While many existing AI management systems have introduced basic mechanisms for enabling fine-tuning of machine learning models, these existing systems face technical shortcomings, such as security risks from user-defined fine tuning tasks and inflexibilities for fine tuning on external tools resulting in unsafe fine-tuned models, lack of reproducibility, and unreliable agent reasoning.

For example, many existing fine-tuning frameworks often rely on a closed-loop process that prevents external systems and users to introduce data or affect weights of a machine learning model during the fine-tuning process. While a closed-loop approach can improve model alignment and security for specific use cases, many closed-loop approaches are unable to flexibly extend fine-tuning LLMs (or other ML models) using user-defined tasks or external tools. For example, many existing systems that extend fine-tuning of closed loop frameworks to user-defined fine tuning tasks or external tools create security risks when exposed to external systems and users. Specifically, in many cases, such existing systems are unable to control for malformed, adversarial, or unsafe content that may pass through inadequate validation pipelines to compromise both model safety and output integrity. In addition, existing systems often lack robust safeguards against such vulnerabilities when user-defined endpoint graders or external evaluators process model outputs. In these situations, some existing systems are prone to sensitive information being inadvertently leaked or malicious payloads being introduced during the fine-tuning of LLMs (or other ML models) using user-defined tasks or external tools.

Furthermore, many existing AI platforms provide limited support for agent training workflows that involve interaction with external tools or third-party endpoints during fine-tuning. For example, many current access mechanisms in AI platforms are often rigid. In particular, many existing AI platforms face difficulties in securely enabling dynamic interactions between models and user-hosted external tools. For example, many existing systems can result in fine-tuning processes of ML models being corrupted through compromised or misconfigured endpoint that supply harmful responses or unauthorized instructions. In many cases, such AI platforms also lack flexible, secure access controls between the ML models being fine-tuned and external tools (or other user-defined functions) to further increase the risk of adversarial behavior or data exfiltration. As a result, many existing systems fail to support safe, scalable agent training that integrates external components into model adaptation workflows.

Moreover, many existing systems also lack adequate governance mechanisms over the outputs of fine-tuned models involving user-defined custom training datasets, reward functions, or grader endpoints. For example, many fine-tuned models may generate unsafe or policy-violating content, leak sensitive information (e.g., chain-of-thought reasoning or regulated personal data), or otherwise operate outside of acceptable compliance boundaries when user-defined training tasks or external tools are utilized in the fine-tuning approaches. In some cases, existing systems utilize safeguards, such as periodic checkpoint evaluations or manual audits. However, such safeguards in many cases provide limited assurances and are not sufficient to prevent user misuse, reward function manipulation, or inadvertent distillation of proprietary model capabilities.

SUMMARY

One or more embodiments described herein provide benefits and/or solve one or more problems in the art with systems, methods, and non-transitory computer-readable storage media that utilizes an agentic reinforcement fine-tuning pipeline for a safer, accurate, and customizable fine-tuning process to fine tune an agent machine learning (ML) model utilizing user-defined grader model endpoints and/or external digital tools with a multi-layer security architecture. In particular, the disclosed systems can fine tune an agent machine learning model using a multi-layer security architecture to safely and effectively interact with external digital tools and user-defined grader models during training. For example, the disclosed systems can utilize a multi-layer security architecture to filter incoming training datasets, perform content refusal checks, chain-of-thought leak detections, and/or governance oversights prior to training the agent ML model, during active training of the agent ML model using external tools and/or grader models, and/or during post-training of the agent ML model (prior to releasing a fine-tuned snapshot of the model). In addition, the disclosed systems can generate stateful trajectory rollouts to associate training trajectories of the agent machine learning model to unique identifiers to facilitate multiple environments and/or tasks to run concurrently while maintaining consistency across external tool calls and grading interactions during the training of the agent machine learning model.

BRIEF DESCRIPTION OF THE DRAWINGS

The detailed description provides one or more embodiments with additional specificity and detail through the use of the accompanying drawings, as briefly described below.

FIGS. 10A, 10B, 10C, 10D, and 10E illustrate an agent model fine-tuning system generating and displaying one or more dashboards for training data in accordance with one or more implementations.

DETAILED DESCRIPTION

Figure 1:
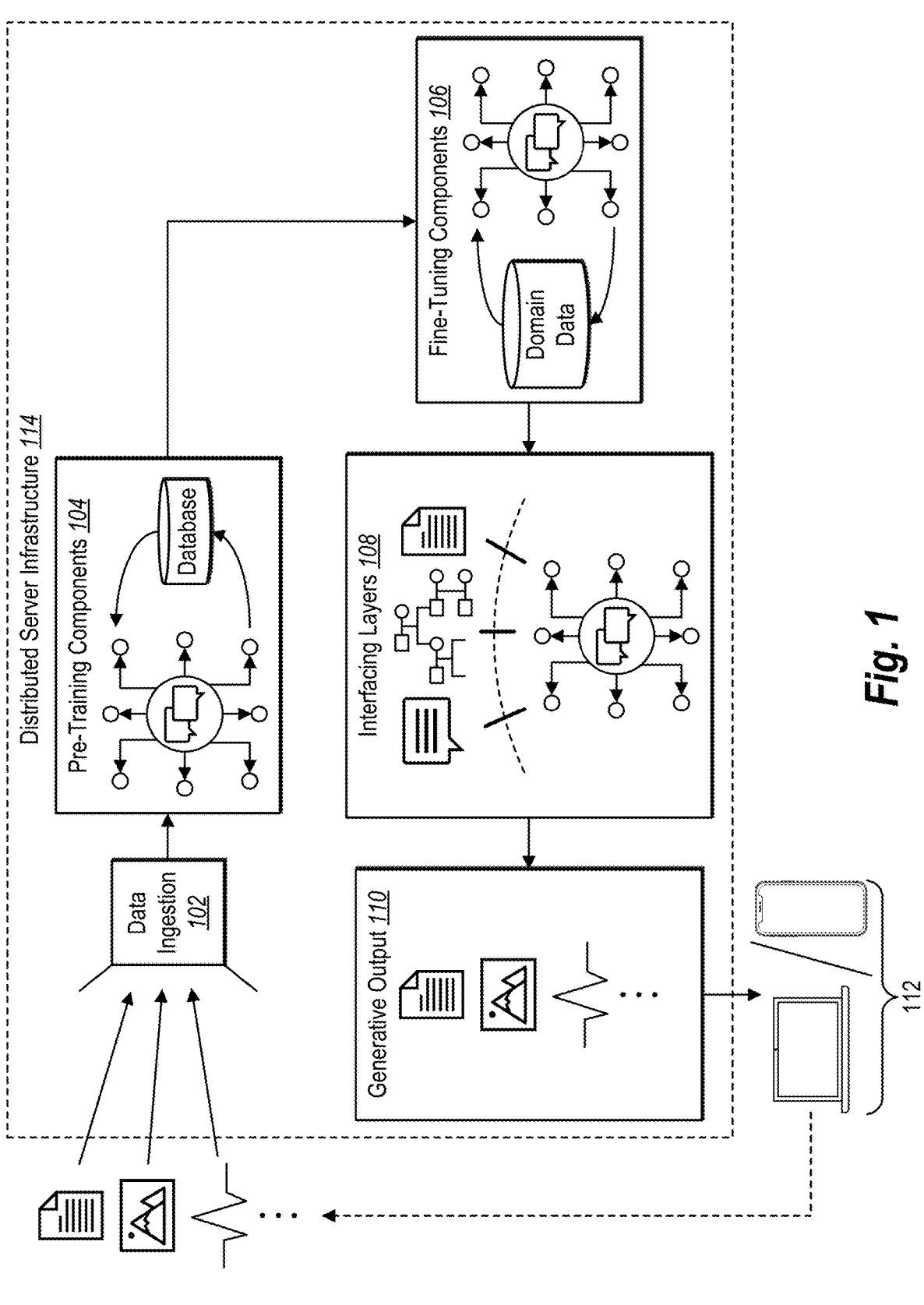
FIG. 1 illustrates a high-level architecture of a generative artificial intelligence system for implementing large language models and other generative models in accordance with one or more embodiments of the present disclosure.

This disclosure describes embodiments of an agent model fine-tuning system that utilizes a multi-layer security architecture to facilitate agent reinforcement fine-tuning of a machine learning (ML) model through the utilization of an external digital tool and/or a user-defined grader model. For example, the agent model fine-tuning system can train an agent machine learning (ML) model with calls to one or more real-world (external) digital tools and/or a user-defined grader model. In particular, the agent model fine-tuning system can utilize a reinforcement fine-tuning pipeline that securely hosts user-defined grading model endpoints to facilitate customized scoring logic and/or domain-specific evaluations of agent ML model outputs (improving data control and privacy for end users). In addition, the agent model fine-tuning system can cause an agent ML model to invoke one or more external digital tools within the model's chain-of-thought during training to achieve reliable multi-step reasoning workflows customized to real-world digital tools. Indeed, the agent model fine-tuning system can utilize a reinforcement fine-tuning pipeline having a multi-layer security architecture that integrates training data intake validation, safety screening of training data, conversation and grader integrity checks, secure tool and endpoint integrations, training loop observabilities, and post-training safety and refusal evaluations to fine-tune an agent ML model. In addition, the agent model fine-tuning system can utilize stateful training trajectories for the agent ML model with unique identifiers to maintain consistency across external tool calls and grading interactions during the training of the agent machine learning model.

For example, the agent model fine-tuning system utilizes a multi-layer security architecture to enforce strict safety and reliability during training of an agent ML model utilizing external digital tools and/or user-defined grader models. For instance, the agent model fine-tuning system can utilize a layered set of mitigations throughout the training lifecycle of the agent ML model. In some implementations, at intake of training data, the agent model fine-tuning system performs structural validation, schema enforcement, and/or moderation filtering to block unsafe content or covert chain-of-thought (CoT) leakage in uploaded training datasets. Furthermore, during training, the agent model fine-tuning system can screen each model output destined for an external tool call to prevent unsafe content or unintended reasoning traces from being exposed to third-parties or third-party systems. Additionally, the agent model fine-tuning system can also validate tool outputs from one or more external digital tools for safety and bounded size to prevent security vulnerabilities within the agent ML model (or generative AI system). Moreover, in one or more instances, the agent model fine-tuning system sandboxes and/or tests user-specified grader models (e.g., APIs, models, or code scripts) for malicious or unstable behavior and/or integrity before utilization in fine-tuning the agent ML model. In addition, post-training, the agent model fine-tuning system can operate content refusal, safety, and chain-of-thought leak checks on the fine-tuned agent ML model to ensure that fine-tuned checkpoints are not misaligned or backdoored (e.g., via skeleton key attacks) prior to releasing access of the fine-tuned checkpoints to users.

Furthermore, in one or more embodiments, the agent model fine-tuning system can utilize a proxying and network boundary architecture to protect model weights and secrets from external digital tool hosts or other third-party systems. For example, the agent model fine-tuning system can utilize a proxying and network boundary architecture to avoid direct outbound calls to external tool or other system endpoints by training clusters that hold sensitive model parameters. Indeed, the agent model fine-tuning system can proxy requests through a unified cluster boundary that has no access to weights and is exposed safely for inference network traffic. In addition, the agent model fine-tuning system can also utilize authentication headers that are encrypted for API calls, redacted in logs, and securely transmitted during requests to ensure that users can integrate one or more external tools and grader models per training run while preventing leakage of proprietary model information.

One or more embodiments described herein disclose an agent model fine-tuning system that utilizes a multi-layer security architecture to facilitate agent reinforcement fine-tuning of an agent ML model through the utilization of an external digital tool and/or a user-defined grader model as part of a generative artificial intelligence system. For example, FIG. 1 illustrates a high-level architecture of a generative artificial intelligence ("AI") system 100 for implementing large language models and other generative models (i.e., an agent ML model) to enable natural language processing, conversational interfaces, multimodal content generation, and analysis. The generative AI system 100 may include data ingestion pipelines 102, pre-training components 104, fine-tuning components 106, interfacing layers 108, and supporting hardware in the form of a distributed server infrastructure 114.

As used herein, the term "generative model" refers to a machine learning model that is configured to generate new data samples that are statistically consistent with the data on which the model was trained. In one or more cases, generative model can include an agent ML model (as described herein). Generative models may include, but are not limited to, large language models, diffusion models, variational autoencoders, generative adversarial networks, and multimodal transformer models. Generative models may be configured to generate outputs across various modalities, including text, images, audio, and video, either independently or conditionally based on input data from the same or a different modality. For example, a generative model may generate an image based on a textual prompt, generate speech based on textual input, or generate text based on prior conversational context, and may operate using probabilistic or iterative denoising methods to produce high-quality, contextually appropriate outputs.

As used herein, the term "large language model" (or "LLM") refers to a computational model configured to process and generate human-readable text by learning statistical and contextual relationships within natural language data using machine learning techniques. An LLM typically comprises a deep neural network architecture, such as a transformer-based architecture with multiple layers and attention mechanisms, and is trained on large corpora of text using objectives such as masked language modeling, causal language modeling, or autoregressive prediction. The LLM may include billions or trillions of parameters and is capable of performing a variety of language tasks, including but not limited to text generation, summarization, translation, and question answering, by generating outputs based on input prompts in a contextually relevant manner.

Relatedly, the term "machine learning model" refers to a computational construct comprising one or more algorithms and associated parameters that are configured to perform tasks by identifying patterns or relationships within data. A machine learning model may be trained using supervised, unsupervised, semi-supervised, or reinforcement learning techniques, where the model parameters are adjusted based on input data to minimize a loss function or maximize a reward signal. The machine learning model may include, but is not limited to, neural networks (e.g., convolutional neural networks, recurrent neural networks, transformer models), decision trees, support vector machines, or ensemble models, and may be configured to perform tasks such as classification, regression, clustering, anomaly detection, or data generation. A machine learning model may operate on structured, unstructured, or multimodal data and may generate outputs that are used for predictions, decisions, or content generation based on learned representations of input data.

Additionally, the term "neural network" refers to a computational model comprising multiple interconnected processing elements, often referred to as neurons or nodes, that are organized into layers including an input layer, one or more hidden layers, and an output layer. Each neuron in the neural network applies a transformation, which may include a weighted sum of inputs followed by a non-linear activation function, to produce an output that is transmitted to subsequent neurons in the network. Neural networks are configured to learn representations of data by adjusting the weights and biases of the connections between neurons during a training process that minimizes a loss function. The neural network may include various architectures, including but not limited to feedforward neural networks, convolutional neural networks (CNNs), recurrent neural networks (RNNs), and transformer-based networks (e.g., LLMs), and may be utilized for tasks such as classification, regression, pattern recognition, natural language processing, and generative modeling across structured, unstructured, or multimodal data.

The data ingestion pipelines 102 of the generative AI system 100 may receive and preprocess large volumes of structured and unstructured data, including text corpora, image datasets, video datasets, and audio datasets, to support diverse generative model training. Preprocessing may include deduplication, tokenization, normalization, feature extraction (e.g., spectrogram generation for audio), and content safety filtering, preparing data for effective distributed training across server devices.

The pre-training components 104 of the generative AI system 100 may utilize transformer-based architectures for LLMs, as well as additional generative models such as diffusion models for image generation, autoencoders for representation learning, and multimodal transformer models for cross-domain generation tasks. These models may be configured with deep neural network stacks to capture hierarchical, semantic, and contextual relationships within the data.

The generative AI system 100 may employ diffusion models for image and video generation, where the models learn to iteratively denoise random noise into structured outputs conditioned on textual or other modality inputs. The generative AI system 100 may train these models using score-based or denoising diffusion probabilistic methods across distributed server devices within the distributed server infrastructure 114.

The generative AI system 100 may also implement speech generation models, including text-to-speech (TTS) systems using autoregressive or non-autoregressive architectures, and audio diffusion models capable of generating high-fidelity waveforms conditioned on linguistic and prosodic features. Feature extraction components may preprocess audio data to create Mel-spectrograms or other representations used during model training using the pre-training components 104.

Specialty server devices within the generative AI system 100, such as those of the distributed server infrastructure 114, may include GPUs, TPUs, or custom AI accelerators designed for high-throughput operations supporting both transformer and diffusion model training. These servers may differ from ordinary servers by incorporating high-bandwidth memory (HBM), advanced interconnects (e.g., NVLink, PCIe Gen5), and thermal and power management systems optimized for large-scale generative model workloads.

The generative AI system 100 may store shard-specific checkpoints, intermediate latents, and optimizer states for large-scale diffusion models, LLMs, and multimodal models on high-speed local or network-attached storage within the specialty servers, enabling resumption of training and inference jobs after interruptions or updates.

The fine-tuning components 106 of the generative AI system 100 may adapt generative models to specific user tasks or domain tasks, such as personalized content generation, domain-specific summarization, image style transfer, or voice cloning. Fine-tuning may involve supervised fine-tuning on task-specific datasets and reinforcement learning with human feedback (RLHF) where applicable, with data and gradients distributed across server devices for scalable operation.

The interfacing layers 108 of the generative AI system 100 may handle user prompts for LLM-based text generation, text-to-image generation requests, and speech synthesis requests. The system may tokenize or encode user prompts, generate conditioning latents where applicable (e.g., CLIP embeddings for image generation), and distribute inference tasks across server clusters for each modality-specific generative model. The interfacing layers 108 may include computer scripts, subroutines, or integrated tools for processing prompts, implementing models, and/or performing API calls to supplement and/or augment generative functions of LLMs and other models of the generative AI system 100. In some embodiments, the interfacing layers 108 include databases for accessing stored content (e.g., a vector database of content vectors for comparing with prompt vectors or query vectors) for contextual augmentation of model operation (e.g., for retrieval-augmented generation and its analogs). In some embodiments, the interfacing layers 108 integrate functionality from third-party systems (e.g., external to the generative AI system 100 and/or the distributed server infrastructure 114) into the generative AI system 100 using APIs and/or particular communication protocols to interact with generative model data (e.g., to execute generated code).

As illustrated in FIG. 1, the generative AI system 100 generates generative output 110. The generative AI system 100 can generate the generative output 110 in the form of text responses, images, videos, audio clips, or other multimodal digital content. The generative AI system 100 can generate the generative output 110 using the interfacing layers 108 in conjunction with one or more trained (e.g., pre-trained and fine-tuned, using the described components) generative models, including LLMs and others described herein.

In some embodiments, the generative AI system 100 generates the generative output 110 over one or more conversational interactions or turns with client device(s) 112. Indeed, the generative AI system 100 can provide the generative output 110 for display on the client device(s) 112. In addition, the generative AI system 100 can receive additional input in the form of text-based queries or prompts, images, videos, audio clips, and/or other multimodal content as part of an ongoing conversation between the generative AI system 100 and the client device(s) 112 and/or as part of a new conversation or instantiation of the generative AI system 100.

For large generative models exceeding single-device memory, the generative AI system 100 may implement model parallelism, with different server devices processing partitions of the model during inference across the distributed server infrastructure 114, and may use activation checkpointing and memory recomputation strategies to handle resource constraints efficiently across distributed modalities.

Server devices within the generative AI system 100 may utilize high-bandwidth interconnects for low-latency tensor and latent exchange during multi-stage generation processes (e.g., latent generation followed by decoding in diffusion models). This enables the generative AI system 100 to support complex, multi-step generation tasks, such as generating text and subsequently generating images conditioned on the generated text, while maintaining low latency.

The distributed server infrastructure 114 of the generative AI system 100 may include compute clusters with racks of specialty servers interconnected with high-bandwidth networking technologies such as InfiniBand, RDMA-enabled Ethernet, or custom fabrics, and distributed storage using NVMe over Fabrics (NVMe-oF) for rapid access to large model weights, intermediate outputs, and context data during inference.

The distributed server infrastructure 114 can include safety filtering and content moderation layers that operate in parallel with inference pipelines across modalities, applying token-level filtering for LLM outputs, image or video classification for generated visual content, and audio analysis for speech outputs to ensure outputs comply with operational policies and applicable regulations.

The distributed server infrastructure 114 can include orchestration and resource management layers that dynamically allocate compute, memory, and network resources across modalities, scaling generative model training and inference in response to user demand and system load while monitoring resource health across components of the generative AI system 100.

Collectively, the architecture illustrated in FIG. 1 enables the generative AI system 100 to provide scalable, efficient, and safe generative model services across text, image, video, audio, and other modalities, leveraging specialty server devices and distributed computing for high-throughput training, fine-tuning, and inference across a wide variety of generative AI applications.

Figure 2:
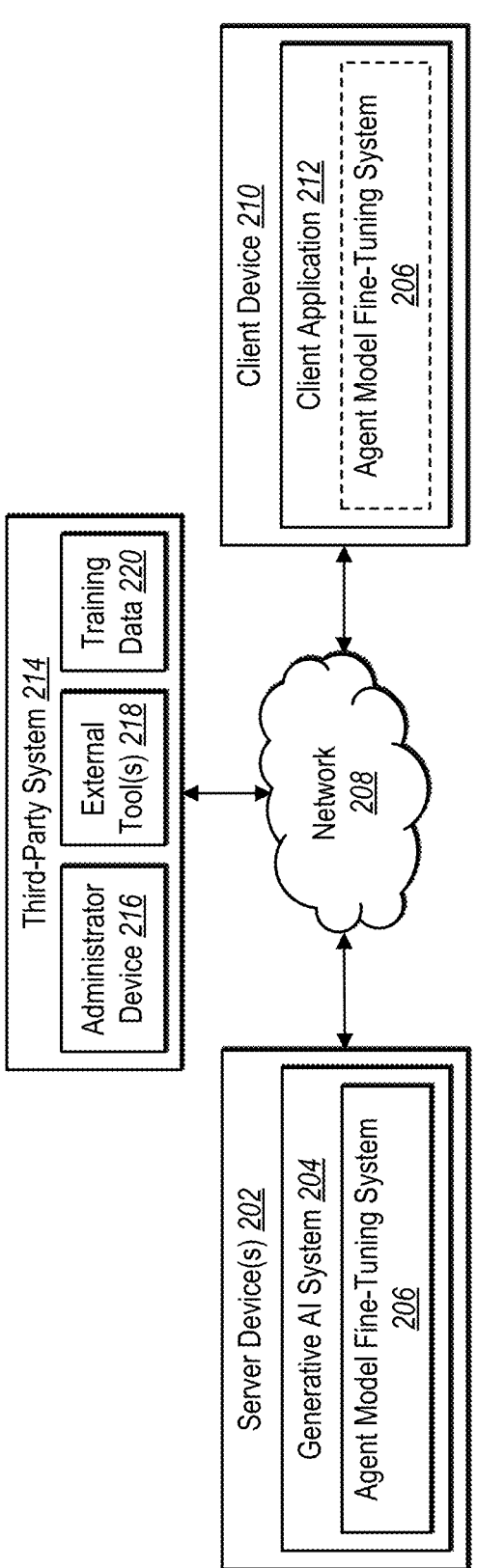
FIG. 2 illustrates a schematic diagram of an example system environment for implementing an agent model fine-tuning system in accordance with one or more implementations.

FIG. 2 illustrates a schematic diagram of an example system environment 200 for implementing an agent model fine-tuning system 206 in accordance with one or more implementations. An overview of the agent model fine-tuning system 206 is described in relation to FIG. 2.

As shown, the environment includes server device(s) 202, a client device 210, a third-party system 214, and a network 208. Each of the components of the environment can communicate via the network 208, and the network 208 may be any suitable network over which computing devices can communicate. Example networks are discussed in more detail below in relation to FIGS. 12 and 13.

As mentioned above, the example environment includes a client device 210. The client device 210 can be one of a variety of computing devices, including a smartphone, a tablet, a smart television, a desktop computer, a laptop computer, a virtual reality device, an augmented reality device, or another computing device as described in relation to FIGS. 12 and 13. The client device 210 can communicate with the server device(s) 202 via the network 208. For example, the client device 210 can receive user input from a user interacting with the client device 210 (e.g., via a client application 212) to, for instance, interact with a generative AI system 204 located on the server device(s) 202. In addition, the agent model fine-tuning system 206 on the server device(s) 202 can receive information relating to various interactions with user interface elements based on the input received by the client device 210.

As shown, the client device 210 can include the client application 212. In particular, the client application 212 may be a web application, a native application installed on the client device 210 (e.g., a mobile application, a desktop application, etc.), or a cloud-based application where all or part of the functionality is performed by the server device(s) 202. Based on instructions from the client application 212, the client device 210 can present or display information, including a dialogue between a user and a large language model as described above (e.g., in relation to FIG. 1). In some cases, a client device 210 can include a device and/or node within a computing cluster (as described herein).

As illustrated in FIG. 2, the example environment also includes the server device(s) 202. The server device(s) 202 may generate, track, store, process, receive, search, communicatively link, and transmit electronic data, such as digital content (e.g., content items), datasets, messages, searchable data, pages of data, prompts, interface elements, searches, browsing activity, browsing data, interactions with interface elements, interactions with selectable connector suggestions, and/or interactions between user accounts or client devices and the generative AI system 204. For example, the server device(s) 202 may receive data from the client device 210 in the form of a user prompt or query. Additionally, the device(s) 202 can process inputs through a large language model and return generated outputs such as text, summaries, code, or images. In some embodiments, the device(s) 202 manage auxiliary tasks such as session tracking, context management, content filtering, and integration with databases or external tools. Indeed, the server device(s) 202 can communicate with the client device 210 to send and/or receive data via the network 208. In some implementations, the server device(s) 202 comprise(s) a distributed server where the server device(s) 202 include(s) a number of server devices distributed across the network 208 and located in different physical locations. The server device(s) 202 can comprise one or more content servers, application servers, communication servers, web-hosting servers, machine learning server, and other types of servers.

As shown in FIG. 2, the server device(s) 202 can also include the agent model fine-tuning system 206 as part of a generative AI system 204. The generative AI system 204 can communicate with the client device 210 to perform various functions associated with the client application 212 such as receiving text prompts or queries and generating outputs using a large language model. The generative AI system 204 ingests structured or unstructured input data and uses the large language model to intelligently produce outputs. The generative AI system 204 can further interface with backend infrastructure to manage contextual state, retrieve relevant documents, and update session-specific information. In some examples, the generative AI system 204 interacts with a cloud storage module to access user-linked content items or synchronize generated outputs with external third-party applications. In addition, the agent model fine-tuning system 206 can utilize a reinforcement fine-tuning pipeline for a safer, accurate, and customizable fine-tuning process to fine tune an agent machine learning (ML) model utilizing user-defined grader model endpoints and/or external digital tools with a multi-layer security architecture for the generative AI system 204.

As shown in FIG. 2, the example environment also includes a third-party system 214. The third-party system 214 can include a third-party service, enterprise, user, or other system that utilizes one or more digital applications and/or tools. As shown in FIG. 2, the third-party system 214 includes an administrator device 216. In one or more instances, the third-party service, via the administrator device 216, can provide one or more configurations (e.g., parameters, training data, and/or settings) to customize fine-tuning of a generative model (i.e., an agent ML model) on the generative AI system 204. For example, the third-party system 214 can include training data 220 for customized training examples specific to one or more tools or applications corresponding to the third-party system 214 (in accordance with one or more implementations herein). In addition, the third-party system 214 can host one or more external tool(s) 218 that interact with the agent model fine-tuning system 206 (in accordance with one or more implementations herein). Indeed, the example environment can include various numbers of third-party systems that interact with the agent model fine-tuning system 206 to customize the fine-tuning of one or more generative models on the generative AI system 204 (in accordance with one or more implementations herein).

Although FIG. 2 depicts the agent model fine-tuning system 206 located on the server device(s) 202, in some implementations, the agent model fine-tuning system 206 may be implemented by (e.g., located entirely or in part on) one or more other components of the environment. For example, the agent model fine-tuning system 206 may be implemented by the client device 210 and/or a third-party device. For example, the client device 210 can download all or part of the agent model fine-tuning system 206 for implementation independent of, or together with, the server device(s) 202. In some embodiments, the agent model fine-tuning system 206 is implemented as a plug-in or modular extension associated with a large language model.

In some implementations, though not illustrated in FIG. 2, the environment may have a different arrangement of components and/or may have a different number or set of components altogether. For example, the client device 210 may communicate directly with the agent model fine-tuning system 206 bypassing the network 208. As another example, the environment can include a database located external to the server device(s) 202 (e.g., in communication via the network 208) or located on the server device(s) 202, on third-party servers, and/or on the client device 210.

Figure 3A:
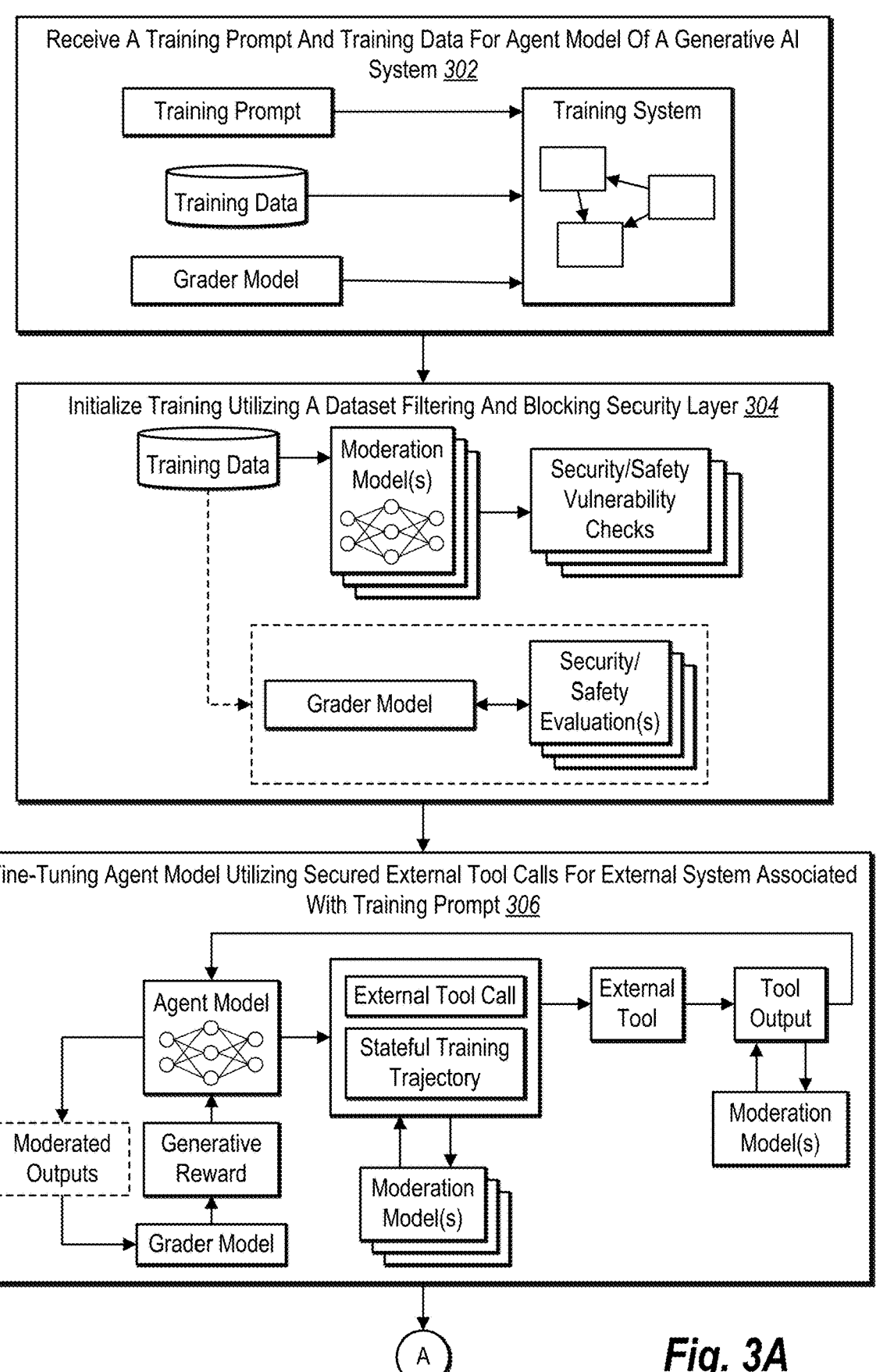
FIGS. 3A and 3B illustrate an overview of an agent model fine-tuning system fine-tuning an ML model through the utilization of an external digital tool and a user-defined grader model in accordance with one or more implementations.
Figure 3B:
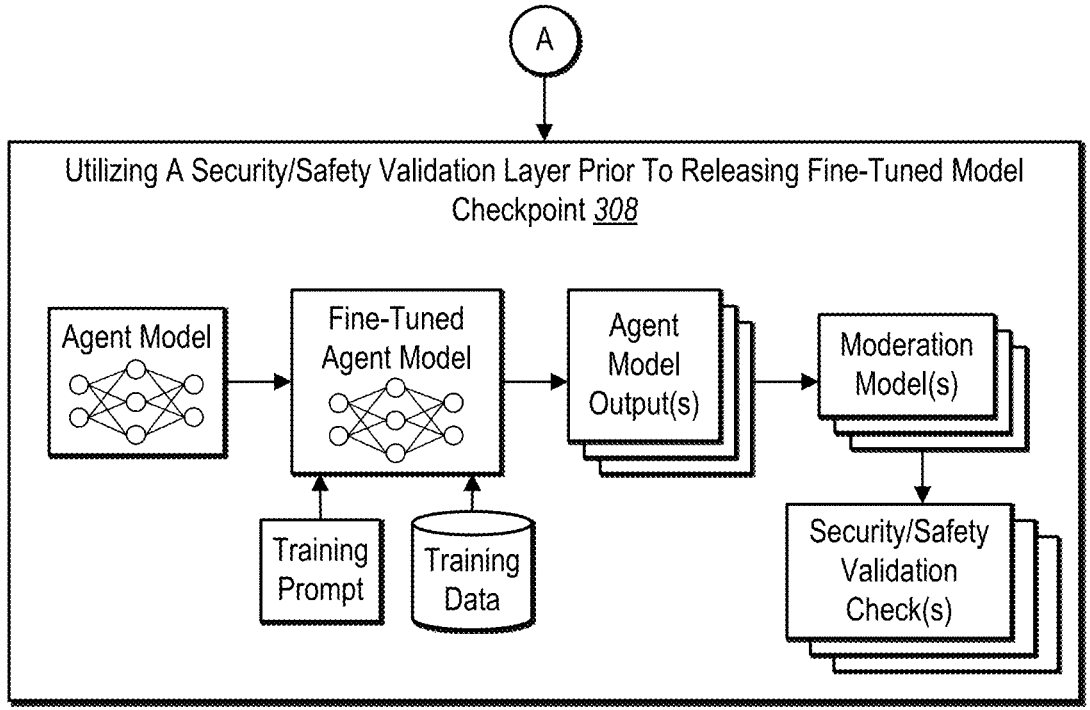

As mentioned above, the agent model fine-tuning system 206 can utilize a multi-layer security architecture to facilitate agent reinforcement fine-tuning of an ML model through the utilization of an external digital tool and/or a user-defined grader model. For example, FIGS. 3A and 3B illustrate an overview of the agent model fine-tuning system 206 fine-tuning an ML model through the utilization of an external digital tool and/or a user-defined grader model. In particular, FIGS. 3A and 3B illustrate an overview of the agent model fine-tuning system 206 utilizing a multi-layer security architecture to fine tune an agent model to utilize external digital tools and/or user-defined grader models.

For example, as shown in an act 302 of FIG. 3A, the agent model fine-tuning system 206 receives a training prompt and training data for an agent model of a generative AI system. For example, the agent model fine-tuning system 206 can receive, from an administrator device of a third-party system, a training prompt with instructions to fine-tune an agent model within a training system of a generative AI system cluster using a set of training data. Indeed, Moreover, the agent model fine-tuning system 206 can also receive a user-defined grader model (or access instructions to a grader model) to utilize during the fine-tuning of the agent model within the training system. Indeed, the agent model fine-tuning system 206 can receive training prompts and training data for agent model fine-tuning as described in greater detail below (e.g., with reference to FIGS. 4 and 5).

As further shown in an act 304 of FIG. 3A, the agent model fine-tuning system 206 initializes training utilizing a dataset filtering and blocking security layer. In one or more instances, the agent model fine-tuning system 206 can preprocess the training samples from the provided training data for security/safety vulnerability checks and integrity (e.g., utilizing moderation model(s)). In addition, the agent model fine-tuning system 206 can also process a user-defined grader model to determine one or more grader integrity, security, and/or safety evaluation(s), such as, but not limited to, potential chain-of-thought leak detections, disallowed and/or malicious instructions, and/or grader model errors for grader model integrity validation. Indeed, the agent model fine-tuning system 206 can utilize a dataset filtering and blocking security layer to preprocess training data and/or to evaluate a user-defined grader model as described in greater detail below (e.g., with reference to FIGS. 4-6).

In addition, in an act 306 of FIG. 3A, the agent model fine-tuning system 206 fine-tunes an agent model utilizing secured external tool calls for an external system associated with the training prompt. In one or more instances, during the processing of training samples, the agent model can determine that an external tool call is appropriate to accomplish (or generate) a response to a training sample prompt. Indeed, the agent model can generate and transmit an external tool call and a stateful training trajectory (to maintain consistency during training) for an external digital tool to receive a tool output (or response) for utilization in the agent model. Indeed, the agent model fine-tuning system 206 can utilize moderation model(s) to analyze external tool calls (outbound to external tools) and/or tool outputs (inbound to the agent model) for security/safety vulnerabilities, such as, but not limited to, prohibited content, prohibited instructions, chain-of-though leaks, and/or training parameter leaks to external systems. For example, the agent model fine-tuning system 206 can utilize the security/safety vulnerability checks from the moderation model(s) to terminate or prevent external tool calls and/or tool outputs by removing violating calls or outputs and/or by terminating training of the agent model. Moreover, the agent model fine-tuning system 206 can utilize agent model outputs with an internal grader model and/or with an external grader model (after the security/safety vulnerability checks as moderated outputs) to determine generative rewards to fine-tune the agent model. Indeed, the agent model fine-tuning system 206 can fine-tune an agent model utilizing secured external tool calls utilizing security vulnerability checks as described in greater detail below (e.g., with reference to FIGS. 4, 7, and 8).

Moreover, as shown in the transition from FIG. 3A to 3B in an act 308, the agent model fine-tuning system 206 utilizes a security/safety validation layer prior to releasing a fine-tuned model checkpoint. In particular, the agent model fine-tuning system 206 can generate a fine-tuned agent model (by training as described above). Moreover, the agent model fine-tuning system 206 can utilize the same training prompt and training data to generate agent model outputs from the fine-tuned agent model. In addition, the agent model fine-tuning system 206 can utilize the moderation model(s) to determine security/safety vulnerability check(s) on the agent model outputs from the fine-tuned agent model checkpoint to identify potential backdoor and/or misaligned responses resulting from the fine-tuning of the agent model. Upon determining that the agent model outputs are secure (e.g., pass the security/safety vulnerability checks), the agent model fine-tuning system 206 can release access to the fine-tuned agent model checkpoint to the administrator device (of the external system training the agent model). Indeed, the agent model fine-tuning system 206 can utilize a security/safety vulnerability layer prior to releasing a fine-tuned model checkpoint as described in greater detail below (e.g., with reference to FIGS. 4 and 9).

As illustrated by the foregoing discussion, the present disclosure utilizes a variety of terms to describe the features and benefits of the agent model fine-tuning system 206. Additional detail is hereafter provided regarding the meaning of these terms as used in this disclosure. As used herein, the term "training prompt" refers to input provided to a large language model (LLM) or agent model for the purpose of initiating training. A training prompt can include natural language instructions, structured queries, or other task specifications that guide the model in generating outputs. A training prompt can further enable the model to invoke external tools and/or services during the training process and/or to receive evaluations from user-defined grader models. For example, a training prompt can serve as a starting condition for training interactions that combine model reasoning, tool usage, and/or grader feedback to improve agent model performance.

Furthermore, as used herein, the term "training sample" refers to training data utilized to improve the performance of an LLM, such as, an agent model. For instance, a training sample can include a training prompt and associated outputs, tool interactions, grader evaluations, and/or rewards generated in response to the prompt. A training sample can encompass an initial input for an LLM and also the model's responses, calls to external tools, and/or feedback from user-defined grader models to provide a complete basis for reinforcement-based fine-tuning and/or other fine-tuning approaches.

As used herein, the term "agent model" (sometimes referred to as "agentic model") refers to a type of generative machine learning model, such as an LLM, that is configured to generate outputs in response to input data and to further interact with external systems, services, and/or tools to achieve a task. For example, an agent model can receive training prompts, generate intermediate or final responses, invoke external tools or application programming interfaces (APIs) to communicate with external tools, and/or process returned results (i.e., external tool outputs) as part of the model's reasoning process. In addition, an agent model can further interact with user-defined grader models that evaluate its outputs or tool-augmented behaviors to train and/or fine-tune through reinforcement or feedback signals.

As used herein, the term "stateful training trajectory" refers to a set of training operations executed by an agent model (or other LLM) that is tied to a persistent state across multiple stages of model reasoning, tool invocation, and/or grader evaluation. For instance, a stateful training trajectory can begin with a training prompt and continue through the model's generation of outputs, invocation of external tools, processing of tool responses, and/or reception of grader model feedback. In addition, the agent model fine-tuning system 206 can utilize a stateful training trajectory to maintain consistency and continuity by associating all related inputs, outputs, and/or interactions with a trajectory identifier and/or trajectory metadata. In some cases, the agent model fine-tuning system 206 can utilize the stateful training trajectory to enable reproducibility, auditing, and/or fine-grained control over training iterations of an agent model.

In addition, as used herein, the term "trajectory identifier" refers to a value assigned to a training trajectory that associates the training prompt, model outputs, tool calls, tool responses, and/or grader evaluations within coherent set of events. For instance, the agent model fine-tuning system 206 can utilize a trajectory identifier to ensure that operations and/or records corresponding to a given training trajectory remain consistently linked. Furthermore, as used herein, the term "trajectory metadata" refers to information associated with a trajectory identifier that describes attributes of the training trajectory, such as task type, environment, and/or other contextual parameters corresponding to the training trajectory of the agent model. In some cases, the agent model fine-tuning system 206 can utilize trajectory metadata to provide constraints for agent model execution, define boundaries for external digital tool usage, and/or support structured logging and auditing of training interactions.

As used herein, the term "digital tool" refers to a computational function, service, or application that can be utilized by an agent model (or other LLM) to perform a task (e.g., in addition to native text generation capabilities). For example, a digital tool can provide information retrieval, data transformation, computation, content generation, or other domain-specific operations that augment the model's reasoning process. For example, the agent model fine-tuning system 206 can integrate a digital tool directly into the model's training or inference environment or access the digital tool through a defined interface or communication protocol (e.g., an API).

As used herein, the term "external digital tool" refers to a digital tool that resides outside an agent model's core execution environment and is accessed via a communication interface such as an application programming interface (API), network endpoint, or secure proxy. An external digital tool can include third-party services, customer-provided applications, or independently managed systems that the agent model can invoke during training or inference to obtain data or perform actions. An external digital tool can return results that are incorporated into the model's context window to enable the agent model to generate outputs informed by real-time or domain-specific resources while maintaining security and state consistency (in accordance with one or more implementations herein).

As used herein, the term "tool output" refers to the data, response, or result generated by a digital tool or external digital tool when invoked by an agent model (or other LLM) during training or inference. A tool output can include unstructured text, structured data (e.g., JSON, tables, or key-value pairs), numerical results, or other content produced by the digital tool in response to a request (i.e., a tool call). A tool output can be inserted into the model's context window, stored with trajectory metadata, or otherwise utilized to inform subsequent reasoning steps, additional tool calls, and/or final outputs.

As used herein, the term "agent output" refers to a response or result generated by an agent model while processing a training prompt or performing a task. An agent output can include intermediate reasoning steps, natural language text, structured data, tool invocation requests, and/or final answers generated by an agent model (or other LLM). An agent output can incorporate tool outputs retrieved from digital tools (or external digital tools). Furthermore, an agent output can be evaluated by user-defined grader models to produce reward signals or performance assessments for fine-tuning the agent model.

As used herein, the term "secure proxy architecture" refers to a set of processes in which communications between an agent model and one or more external digital tools are routed through one or more layers that enforce security, privacy, and/or reliability constraints. For instance, a secure proxy architecture can prevent direct exposure of model weights, secrets, and/or sensitive infrastructure by ensuring that training or inference clusters do not directly communicate with external endpoints. For instance, the secure proxy architecture can transmit outbound requests through a unified cluster or proxy service that manages authentication, redacts sensitive information from logs, enforces network boundaries, and/or validates tool responses for safety and/or size limits of an agent model. In some cases, the agent model fine-tuning system 206 can utilize a secure proxy architecture to enable safe integration of external tools and/or grader models into training trajectories of an agent model while maintaining isolation of critical model parameters and system resources. In some cases, the agent model fine-tuning system 206 can utilize a secure proxy architecture as described in relation to FIG. 7.

As used herein, the term "security vulnerability check" (sometimes referred to as security and/or safety vulnerability check) refers to an evaluative object generated by a generative AI system (or moderation model of the generative AI system) that indicates the result of analyzing a tool call, tool output, agent output, and/or grader evaluation for potential security and/or safety risks. For instance, the agent model fine-tuning system 206 can generate a security vulnerability check by applying one or more moderation models to the data under analysis to evaluate factors such as chain-of-thought leakage, injection of malicious or unsafe content, inclusion of prohibited content items, inclusion of malicious and/or prohibited instructions, and/or invalid schemas. Indeed, in one or more instances, the generated security vulnerability check encapsulates a final decision indicating whether the analyzed data passes for continued use in generating agent outputs or updating model parameters or fails and is excluded from further training or inference.

Furthermore, as used herein, the term "security vulnerability" (sometimes referred to as a security and/or safety vulnerability) refers to a condition in which a tool call, tool output, and/or agent output could expose an agent model to risks that compromise its safety, integrity, and/or reliability. A security vulnerability can include, but is not limited to, chain-of-thought leakage, injection of malicious or unsafe content, or inclusion of prohibited content items that may adversely affect model behavior or system security. In some cases, a security vulnerability can include, but is not limited to, privacy and compliance breaches, terms of service and/or policy violations, distillation attempts of private and/or proprietary model reasoning and/or parameters, reward function manipulations (of grader models), malicious grader model instruction prompts, invalid grader and/or tool schema structural integrities, malicious tool behaviors (e.g., tool outputs that return harmful and/or incorrect responses to corrupt model learning), and/or malicious payloads.

As used herein, the term "grader model" refers to a computational model, script, and/or set of instructions for an LLM model that is configured to evaluate one or more outputs generated by an agent model (or other LLM) in response to a training prompt. For instance, the agent model fine-tuning system 206 can utilize a grader model (or instruction prompts for a grader model) to compare an agent output against reference answers, apply predefined evaluation rules, and/or generate a reward signal reflecting the quality, correctness, safety, and/or usefulness of the agent model output. In one or more embodiments, a grader model can include programmatic matchers, user-defined prompts for LLM models, and/or external grader systems accessed through digital tools. In one or more instances, a grader model generates evaluations of agent model outputs to guide reinforcement learning, fine-tuning, and/or parameter updates of the agent model. For example, a grader model can include, but is not limited to, a python script, an endpoint grader, a regex tester, and/or instructions or prompts for an LLM model-based grader.

As used herein, the term "sandbox environment" refers to an isolated and controlled execution environment in which a grader model or external grader system is deployed for evaluation purposes. For example, the agent model fine-tuning system 206 can utilize a sandbox environment to evaluate variations or configurations of an external grader model against training samples while ensuring that the grader's inputs, outputs, and/or mechanisms are safe, stable, and/or reliable before being incorporated into the training trajectory of an agent model.

As used herein, the term "moderation model" refers to a computational model configured to analyze inputs, outputs, tool calls, tool responses, and/or grader model reward signals within a generative AI system (for an agent model) to detect unsafe, malicious, and/or undesirable content or behaviors. A moderation model can analyze the above-mentioned data for security vulnerability risks, such as, but not limited to, chain-of-thought leakage, injection of harmful and/or adversarial content, and/or inclusion of prohibited content items. In one or more instances, the agent model fine-tuning system 206 can utilize results generated by a moderation model to generate a security vulnerability check (e.g., to determine whether the analyzed data passes or fails for continued use in fine-tuning or deployment). Furthermore, the agent model fine-tuning system 206 can utilize multiple moderation models that are each trained for different tasks and/or classifications, such as detecting sensitive content, enforcing size limits, malicious behaviors, and/or identifying chain-of-thought reasoning traces.

The agent model fine-tuning system 206 provides several advantages over many existing systems. Unlike conventional fine-tuning platforms that rely on rigid, closed-loop pipelines, the agent model fine-tuning system 206 enables secure, stateful fine-tuning workflows that incorporate user-defined grader models and/or external digital tools without compromising model safety or alignment. In one or more instances, the agent model fine-tuning system 206 achieves this by integrating multi-layered safety validation mechanisms, including dataset filtering, proxy-mediated tool orchestration, grader model integrity and/or security evaluations, and post-training safety evaluations. These mechanisms collectively ensure that unsafe or malformed content, adversarial tool outputs, and/or unvalidated grader results are intercepted and quarantined before affecting model weights. As a result, the agent model fine-tuning system 206 supports flexible, extensible agent training while maintaining fine-grained control over data provenance, tool integration boundaries, and/or training reproducibility across distributed environments.

Furthermore, the agent model fine-tuning system 206 introduces technical safeguards that substantially improve reliability and traceability over existing fine-tuning frameworks. In particular, the agent model fine-tuning system 206 can perform schema-based dataset parsing, token size validation, and/or automated moderation scans to prevent unsafe inputs and malformed data from entering the training pipeline. During training, the agent model fine-tuning system 206 can maintain secure proxy boundaries between models and external tools and ensure that all tool calls and responses are inspected for security vulnerabilities such as chain-of-thought leakage, disallowed instructions, and/or unsafe payloads. In addition, the agent model fine-tuning system 206 can utilize sandboxed grader validation, executing user-defined graders within isolated runtime environments (to prevent data leakage, unauthorized network access, and/or malicious code execution). These capabilities collectively eliminate common failure modes in existing systems where insecure grader endpoints, unvalidated datasets, and/or unrestricted tool calls can lead to compromised fine-tuned models.

Additionally, the agent model fine-tuning system 206 can provide governance, observability, and/or auditability features that are largely absent in many existing systems. The agent model fine-tuning system 206 can generate dashboards and analytical reports displaying safety validation results, model performance metrics, and/or error summaries in real time, allowing reviewers and investigators to monitor active fine-tuning jobs. Moreover, this observability framework also enables the identification of anomalous grader behavior, red-teaming outcomes, and/or moderation regressions with full traceability to individual training trajectories and checkpoints. Combined with its layered safety architecture, the agent model fine-tuning system 206 provides a scalable, compliance-oriented framework that enables safe integration of user-defined training workflows and external components to offer technical, operational, and security advantages over many existing fine-tuning systems.

Figure 4:
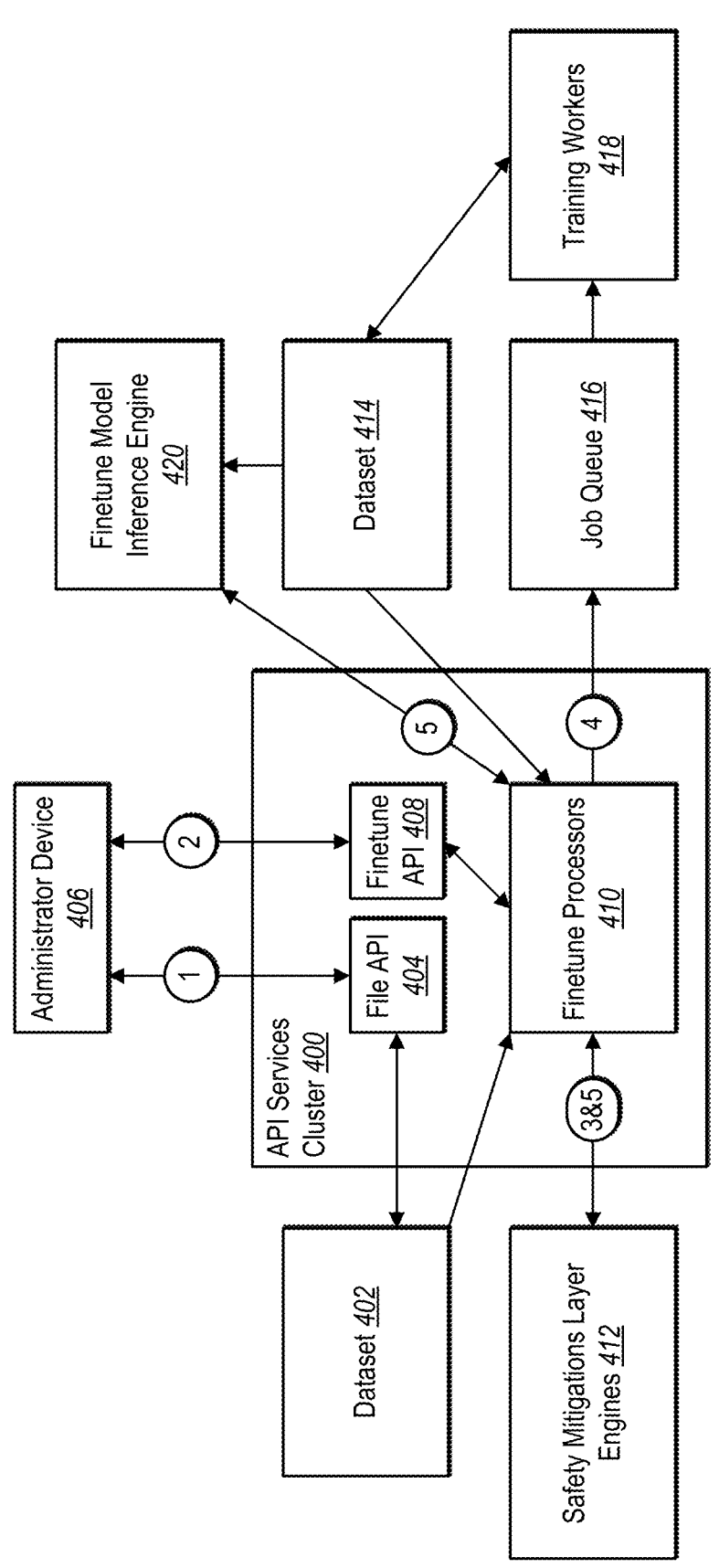
FIG. 4 illustrates a multi-layer security architecture for an agent model fine-tuning pipeline of an agent model fine-tuning system in accordance with one or more implementations.

As mentioned above, the agent model fine-tuning system 206 can utilize a multi-layer security architecture to facilitate agent reinforcement fine-tuning of an ML model through the utilization of an external digital tool and/or a user-defined grader model. For instance, FIG. 4 illustrates a multi-layer security architecture for an agent model fine-tuning pipeline that utilizes external digital tools and/or user-defined grader models. For example, as shown in FIG. 4, the agent model fine-tuning system 206 can be configured to receive datasets, manage training jobs, and apply layered safety mitigations during fine-tuning of an agent model. As shown in FIG. 4, the agent model fine-tuning system 206 can include an API service cluster 400 operatively coupled to a file API 404, a fine-tune API 408, fine-tune processors 410, safety mitigation layer engines 412, a job queue 416, and associated evaluation datasets 414. Moreover, the illustrated components of FIG. 4 are interconnected through directional flows that correspond to sequential steps of operation (labeled steps 1 through 5).

For instance, at step 1 of FIG. 4, the agent model fine-tuning system 206 can receive a dataset 402 from an administrator device 406 (of an external third party system) through the file API 404. The dataset 402 can include training prompts, expected answers, and/or grading contexts for reinforcement fine-tuning an agent model. Moreover, at step 2 of FIG. 4, the agent model fine-tuning system 206 can receive instructions to initiate a fine-tuning job through the fine-tune API 408 (accessed by the administrator device 406). In one or more embodiments, the file API 404 and fine-tune API 408 can function as secure entrance points that enforce authentication and/or structural validation prior to permitting data entry or job submission to the agent model fine-tuning system 206 (or generative AI system 204).

Moreover, at step 3 of FIG. 4, the agent model fine-tuning system 206 can apply safety mitigation layer engines 412 to the dataset 402. In one or more embodiments, the safety mitigation layer engines 412 can utilize one or more moderation models configured to detect unsafe or non-compliant material, including chain-of-thought leakage, prohibited content items, and/or adversarially encoded data (in accordance with one or more implementations herein). In one or more cases, at step 3, the agent model fine-tuning system 206 can proceed to training when datasets pass the security vulnerability checks of the safety mitigation layer engines 412. Likewise, at step 3, the agent model fine-tuning system 206 can block or partially filter datasets that fail to pass the security vulnerability checks (i.e., have one or more security vulnerabilities).

In one or more instances, as part of step 3 of FIG. 4, the agent model fine-tuning system 206 can also determine, from the file API 404 and/or the fine-tune API 408, a user-defined grader model to utilize for the fine-tuning of the agent model. Furthermore, the agent model fine-tuning system 206 can evaluate the user-defined grader model within the safety mitigation layer engines 412 to identify one or more grader integrity and/or security/safety evaluation(s), such as, but not limited to, potential chain-of-thought leak detections and/or grader model errors for grader model integrity validation. In addition, the agent model fine-tuning system 206 can utilize the user-defined grader model with the fine-tune processors 410 to train the agent model in accordance with one or more implementations herein.

Moreover, at step 4 of FIG. 4, the agent model fine-tuning system 206 can utilize the validated dataset 402 with fine-tune processors 410 to initiate a training job for an agent model of the agent model fine-tuning system 206. In particular, the agent model fine-tuning system 206 can initiate the updating of parameters of the agent model according to the provided training samples from the dataset 402 and/or one or more external tool calls and tool outputs (as described herein). For instance, the fine-tune processors 410 can interact with a job queue 416 to schedule training runs and facilitate execution of one or more fine-tuning tasks for the agent model through training workers 418. In some embodiments, the training workers 418 can store or utilize a dataset 414 (as a data storage) to store fine-tuned agent model checkpoints during the training process. Indeed, the agent model fine-tuning system 206 can utilize the API service cluster 400 as a separation layer between the external system (of the administrator device 406) to act as a proxying and network boundary architecture to protect model weights and secrets from external digital tool hosts or other third-party systems.

Furthermore, as part of step 4 of FIG. 4, the agent model can generate one or more external tool calls. The agent model fine-tuning system 206 can utilizes the safety mitigation layer engines 412 to analyze the outbound external tool calls for one or more security vulnerabilities (as described herein). Additionally, the agent model fine-tuning system 206 can receive external tool outputs from external tools (of third-party systems) and analyze the inbound external tool outputs for one or more security vulnerabilities (as described herein) via the safety mitigation layer engines 412. Moreover, during external tool calls, the agent model fine-tuning system 206 can utilize stateful training trajectory data (as described herein) to maintain consistency and continuity amongst inputs, outputs, and/or interactions for the agent model, the fine-tune processors, and one or more external tools (using a trajectory identifier and/or trajectory metadata). In one or more embodiments, the agent model fine-tuning system 206 can utilize the security vulnerability checks of the safety mitigation layer engines 412 for external tool outputs and calls (during training) to continue training and/or block or partially filter training of the agent model.

Furthermore, at step 5 of FIG. 4, the agent model fine-tuning system 206 can utilize a fine-tune model inference engine 420 to evaluate updated agent model checkpoints against the training samples from the dataset 402. In one or more embodiments, the fine-tune model inference engine 420 can reapply the safety mitigation layer engines 412 to agent outputs of the updated agent model checkpoint to determine security vulnerability checks (or evaluations) on the fine-tuned agent model checkpoint (in accordance with one or more implementations herein). For example, the security vulnerability checks can include refusal checks, chain-of-thought leak detection, and/or other moderation tests to confirm that safety regressions have not occurred in the fine-tuned agent model checkpoint. Indeed, when the fine-tuned agent model checkpoint passes the security vulnerability checks from the safety mitigation layer engines

412, the agent model fine-tuning system 206 can release access to the fine-tuned agent model checkpoint to external third party systems (via the administrator device 406 or other devices) corresponding to the training request.

In one or more implementations, the agent model fine-tuning system 206 can integrate platform-native tools in addition to third-party-hosted external tools to expand the range of capabilities available during agent model fine-tuning. For example, the system can enable the agent model to access managed tools via secure internal APIs. The agent model fine-tuning system 206 can execute the platform-native tools within trusted infrastructure and mediated by the secure proxy architecture used for external digital tools (as described herein) to ensuring consistent enforcement of moderation, logging, and/or state tracking.

In one or more implementations, the agent model fine-tuning system 206 can further provide managed infrastructure for grader and tool execution. For example, the system can provision isolated virtual environments, such as containerized sandboxes or customer-specific compute clusters, to securely host external grader models and/or digital tools. These managed environments can include network isolation policies, runtime memory constraints, and/or automated cleanup processes to prevent cross-contamination between training jobs or unauthorized persistence of data. The agent model fine-tuning system 206 can also monitor resource utilization and runtime telemetry from these hosted environments to identify potential misconfigurations or security anomalies.

Figure 5:
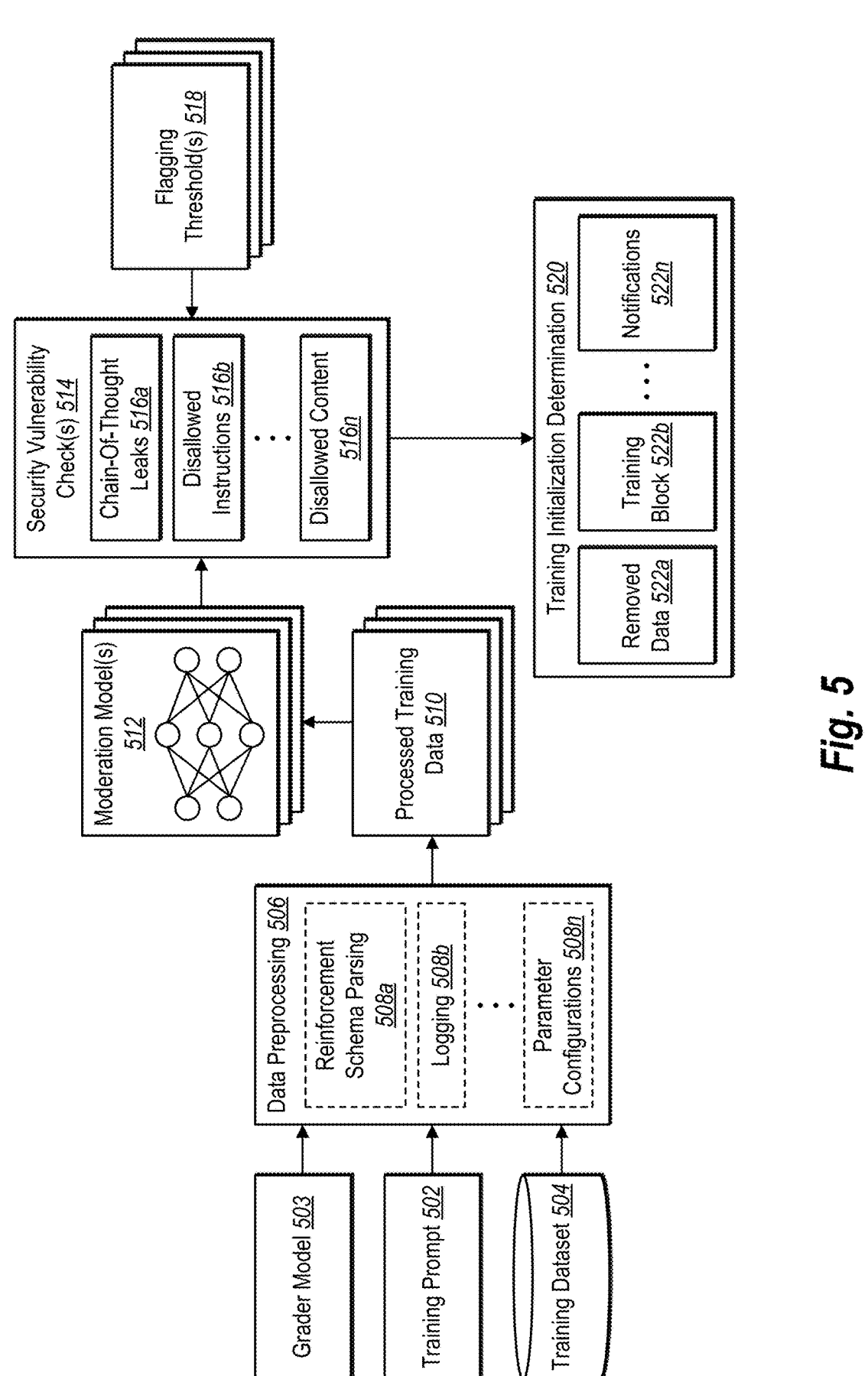
FIG. 5 illustrates an agent model fine-tuning system utilizing a dataset filtering and blocking layer to facilitate the ingestion of a training prompt and associated training dataset within the multi-layer security architecture in accordance with one or more implementations.

As mentioned above, the agent model fine-tuning system 206 can implement a dataset filtering and blocking layer to pre-process incoming training data prior to use in reinforcement-based fine-tuning of an agent model. For instance, FIG. 5 illustrates the agent model fine-tuning system 206 utilizing a dataset filtering and blocking layer to facilitate the ingestion of a training prompt and associated training dataset within the multi-layer security architecture. In particular, FIG. 5 illustrates the agent model fine-tuning system 206 applying a training data preprocessing and security vulnerability check prior to generating training data that is admissible for agent model updates on the generative AI system 204.

For example, as shown in FIG. 5, the agent model fine-tuning system 206 receives a training prompt 502 and a training dataset 504 (as described above). Furthermore, as shown in FIG. 5, the agent model fine-tuning system 206, as part of the dataset filtering and blocking layer, can perform, in an act 506, data preprocessing to enforce structural consistency across the received training dataset 504 and/or training prompt 502. As shown in FIG. 5, the agent model fine-tuning system 206 can perform preprocessing, such as, but not limited to, reinforcement schema parsing 508a, logging 508b, and/or one or more parameter configurations 508n. Indeed, as shown in FIG. 5, the agent model fine-tuning system 206 can generate processed training data 510, from the data preprocessing in the act 506, that conforms to system-defined specifications (of the agent model fine-tuning system 206) for safety and/or schema integrity during training.

As further shown in FIG. 5, the agent model fine-tuning system 206 also receives user-defined grader model data (i.e., grader model 503). As shown in FIG. 5, the agent model fine-tuning system 206, as part of the act 506, performs data preprocessing to enforce structural consistency for the grader model data. As an example, the agent model fine-tuning system 206 can receive user-defined grader model instruction prompts for a grader model (e.g., an LLM-based grader model, such as an LLM-as-a-judge) utilized (or hosted by the agent model fine-tuning system 206). The agent model fine-tuning system 206 can preprocess the user-defined grader model instruction prompts to enforce structural consistency (or scheme integrities) prior to utilizing the user-defined grader model instructions during training. Moreover, the agent model fine-tuning system 206 can preprocess the user-defined grader model instruction prompt by logging data from the user-defined grader model instruction prompt and/or modifying parameter configurations corresponding to parameters called in the user-defined grader model instruction prompt. As an additional example, the agent model fine-tuning system 206 can receive a user-defined grader model script (e.g., a python script) and/or access instructions (e.g., API protocols or other access data) to access an externally hosted grader model (as the grader model 503). Indeed, the agent model fine-tuning system 206 can preprocess the user-defined grader model script, access instructions, and/or components of the externally hosted grader model utilizing, but not limited to, reinforcement schema parsing, logging, and/or parameter configurations (in accordance with one or more implementations herein).

Additionally, as shown in FIG. 5, the agent model fine-tuning system 206 further applies one or more moderation model(s) 512 to the processed training data 510. Indeed, the agent model fine-tuning system 206 utilizes the one or more moderation model(s) 512 with the processed training data 510 to determine one or more security vulnerability check(s) 514. As shown in FIG. 5, the agent model fine-tuning system 206 can utilize the moderation model(s) 512 to generate the one or more security vulnerability check(s) 514 that classify security (and/or safety) violations, such as chain-of-thought leaks 516a, disallowed instructions 516b, and/or disallowed content 516n. In particular, the agent model fine-tuning system 206 can utilize the security vulnerability check(s) 514 to determine whether portions of the training dataset 504 (through the processed training data 510) are admissible or prohibited (i.e., excluded from training).

Furthermore, as shown in FIG. 5, the agent model fine-tuning system 206 utilizes a set of flagging threshold(s) 518 with the security vulnerability check(s) 514 to generate a training initialization determination 520. For instance, as shown in FIG. 5, the agent model fine-tuning system 206 can utilize the flagging threshold(s) 518 with the security vulnerability check(s) 514 to determine rejected training samples (as removed data 522a). In some cases, as shown in FIG. 5, the agent model fine-tuning system 206 can, as part of the training initialization determination 520, determine that the training dataset 504 does not pass the security vulnerability checks (i.e., a threshold number of training samples included security vulnerability issues) and, in response, can determine a training block 522b to terminate the training request of the agent model (e.g., block the training request). Furthermore, as shown in FIG. 5, the agent model fine-tuning system 206 can also generate notifications 522n as part of the training initialization determination 520. In particular, the agent model fine-tuning system 206 can generate and transmit notifications 522n (to one or more devices of the external third party system) to indicate the removed data 522a (in the training initialization) and/or inform the third party system of the training block 522b. Although FIG. 5 illustrates example training initialization determinations, the agent model fine-tuning system 206 can perform various additional actions based on the security vulnerability checks, such as remedying the training data through modification and/or logging the training sample for auditing.

In addition, the agent model fine-tuning system 206 can utilize the processed user-defined grader model instruction prompts (as processed training data 510) with the one or more moderation model(s) 512 to perform a security/safety validation on the processed user-defined grader model instruction prompts (e.g., prior to initiating training). For instance, the agent model fine-tuning system 206 can utilize the moderation model(s) 512 to scan the processed user-defined grader model instruction prompts for one or more security vulnerabilities as described herein (e.g., chain-of-thought leaks 516a, disallowed instructions 516b, and/or disallowed content 516n). Moreover, the agent model fine-tuning system 206 can utilize the security vulnerability check(s) 514 of the processed user-defined grader model instruction prompts to determine a training initialization determination 520 (in accordance with one or more implementations herein).

Furthermore, the agent model fine-tuning system 206 can perform a security/safety validation on the processed user-defined grader model script, processed access instructions, and/or processed components of the externally hosted grader model. For instance, the agent model fine-tuning system 206 can utilize the moderation model(s) 512 to scan the processed user-defined grader model script, processed access instructions, and/or processed components of the externally hosted grader model for one or more security vulnerabilities as described herein (e.g., chain-of-thought leaks 516a, disallowed instructions 516b, and/or disallowed content 516n). Additionally, the agent model fine-tuning system 206 can utilize the security vulnerability check(s) 514 of the processed user-defined grader model script, processed access instructions, and/or processed components of the externally hosted grader model to determine a training initialization determination 520 (in accordance with one or more implementations herein).

Figure 6:
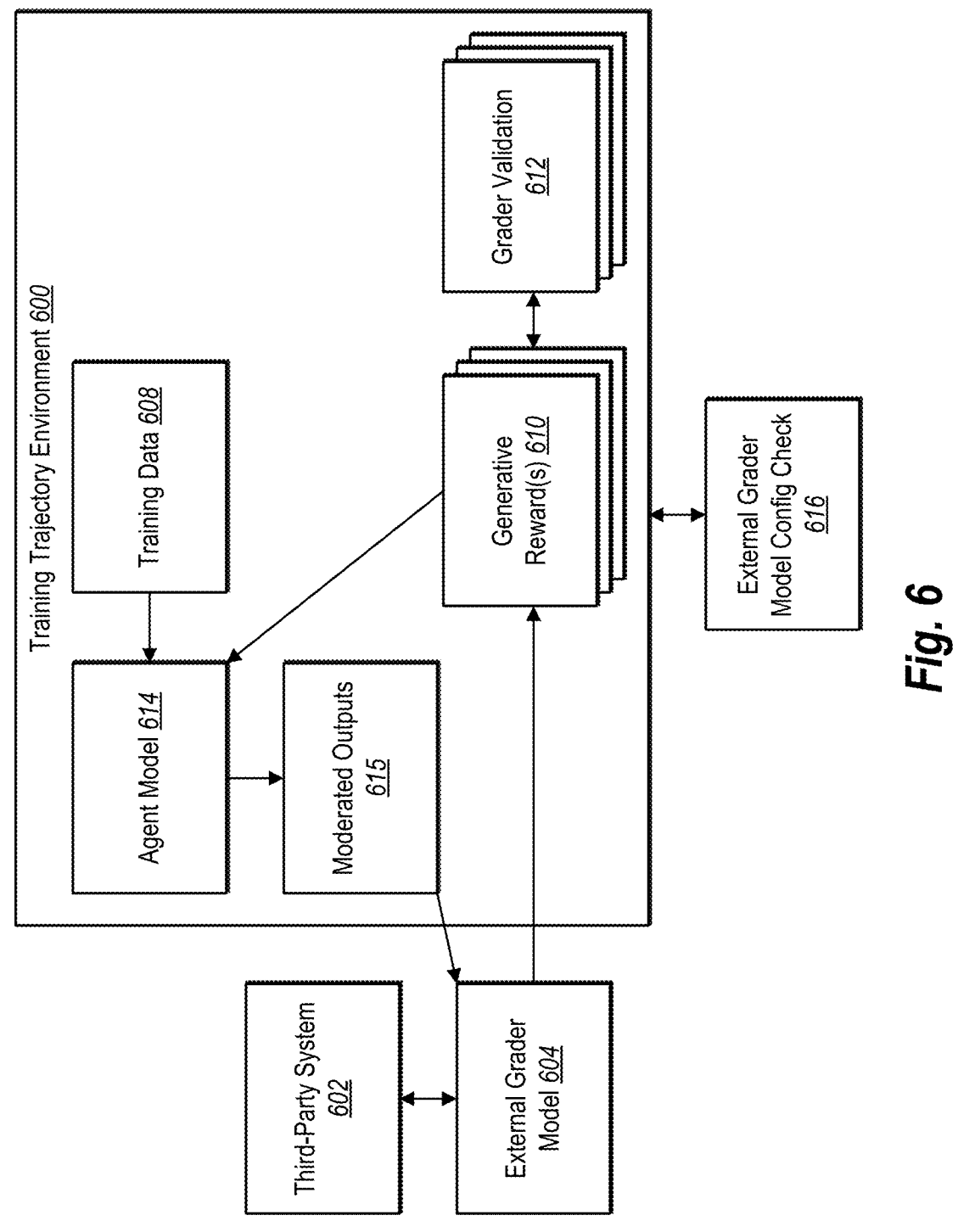
FIG. 6 illustrates an agent model fine-tuning system implementing grader model validation in accordance with one or more implementations.

In one or more instances, the agent model fine-tuning system 206 can utilize a sandbox environment to validate an integrity, security, and/or safety of a user-defined grader model prior to initiating training of an agent model utilizing the user-defined grader model (e.g., as described in FIG. 6).

In one or more cases, the agent model fine-tuning system 206 utilizes the dataset filtering and blocking layer illustrated in FIG. 5 to enforce a first layer of safety by ensuring that incoming training prompts, training samples, and/or associated metadata are screened prior to initiating a stateful training trajectory (in accordance with one or more implementations herein). Indeed, by coupling structured schema validation with moderation-based security vulnerability checks, the agent model fine-tuning system 206 can prevent harmful, misaligned, or non-compliant data from influencing the learning process of the agent model within the generative AI system 204. Furthermore, in one or more instances, the agent model fine-tuning system 206 can utilize the layered filtering approach described in FIG. 5 to enable the agent model fine-tuning system 206 to dynamically adapt to new categories of unsafe content by updating the moderation model(s) and/or validation schemas.

As shown in FIG. 5, the agent model fine-tuning system 206 can perform data preprocessing operations. For instance, the data preprocessing operations can include reinforcement schema parsing to ensure the structural validity of training datasets (and/or grader model data). In one or more implementations, the agent model fine-tuning system 206 can parse each user-provided dataset (and/or grader model data) according to a predefined reinforcement schema specifying required fields for training prompts, model outputs, grader metadata, and/or reward values. The agent model fine-tuning system 206 can verify that the entries conform to the schema, including message ordering, field completeness, and/or proper data typing. If parsing fails for one or more examples, the agent model fine-tuning system 206 can block the dataset from proceeding to training (and generate an error notification identifying the schema inconsistency).

Furthermore, as shown in FIG. 5, the agent model fine-tuning system 206 can perform data preprocessing that includes structured logging of dataset validation events and/or metadata. The agent model fine-tuning system 206 can record schema parsing results, rejected samples, dataset statistics, and/or multimodal attributes to enable traceability and auditing throughout the fine-tuning lifecycle. These logs can include timestamps, dataset identifiers, file hashes, and/or sample counts for both accepted and rejected examples. In some cases, the agent model fine-tuning system 206 can also log anomalies or edge cases, such as mixed input modalities and/or inconsistent tool signatures.

In addition, as illustrated in FIG. 5, the agent model fine-tuning system 206 can further determine parameter and training configuration settings derived from the validated dataset. These settings can include batch size, learning rate, reward scaling, and/or other hyperparameters tuned to the structure and/or size of the parsed dataset. In one or more implementations, the agent model fine-tuning system 206 can also perform token size and count checks to verify that each training example falls within defined context and sequence length limits. The agent model fine-tuning system 206 can flag or remove examples that exceed configured token thresholds to prevent memory overloads, truncated sequences, and/or destabilizing behavior during training. The agent model fine-tuning system 206 can store these configuration and validation results as part of the training initialization state and/or propagate them to downstream fine-tuning modules.

As mentioned above, the agent model fine-tuning system 206 can utilize one or more moderation models to detect one or more security vulnerabilities (e.g., with respect to FIGS. 5, 6, 7, and 9). For instance, the agent model fine-tuning system 206 can utilize one or more moderation models that are trained for different tasks and/or classifications, such as detecting sensitive content, enforcing size limits, malicious behaviors, and/or identifying chain-of-thought reasoning traces. In one or more implementations, the agent model fine-tuning system 206 can utilize the one or more moderation models at multiple layers of the agent model fine-tuning pipeline, such as during training dataset intake (e.g., as described in FIG. 5), grader model validation (e.g., as described in FIG. 6), proxy-mediated tool orchestration and scanning (e.g., as described in FIGS. 7 and 8), and/or post-training safety evaluations (e.g., as described in FIG. 9). For instance, each moderation model can analyze various data types, including, but not limited to, training prompts, tool outputs, grader evaluations, and/or agent outputs.

In one or more implementations, the one or more moderation models can include large language models (LLMs) that are trained, fine-tuned, or prompted to perform contextual safety evaluations. For example, the agent model fine-tuning system 206 can utilize an LLM moderation model that applies zero-shot or few-shot learning techniques to detect policy violations, chain-of-thought leakage, unsafe reasoning behaviors, and/or prohibited content. For example, the agent model fine-tuning system 206 can utilize LLM-based moderation models that evaluate multi-turn agent interactions and identify nuanced security vulnerabilities, such as indirect prompt injection attempts or data extraction patterns that occur across multiple reasoning steps. In addition, the LLM-based moderation models can dynamically adapt to new threat categories through prompt updates or fine-tuning on recently identified safety incidents Additionally, the agent model fine-tuning system 206 can utilize classifier models that are specifically trained for structured detection tasks. In some cases, the classifier models can include models that perform multi-level classification of safety events. For example, the agent model fine-tuning system 206 can utilize chain-of-thought classification model to detect and classify chain-of-thought leaks across generated agent outputs, tool call sequences, grader model instruction prompts, grader model scripts and/or components, and/or grader model reward signals. The chain-of-thought model can analyze textual and structural features of the model outputs to determine whether the agent model exposes internal reasoning traces, proprietary context, and/or other protected information. In addition, the agent model fine-tuning system 206 can utilize one or more classifier models configured to identify malicious payloads, disallowed content, and/or violations of tool interaction policies.

Furthermore, the one or more moderation models can include specialized content detection models designed for domain-specific or modality-specific safety analysis. For instance, the agent model fine-tuning system 206 can utilize natural language, code, or data classifiers that detect prohibited material, injection attempts, and/or sensitive entities within tool outputs or grader model evaluations, grader input prompts, and/or grader model scripts. In some cases, the content detection models can apply statistical anomaly detection, embedding similarity analysis, and/or rule-based scanning to identify deviations from approved content and/or tool behavior schemas. In one or more cases, the agent model fine-tuning system 206 can ensemble the outputs of multiple moderation models—such as LLM-based models, classifier models, and content detection models—to generate a one or more security vulnerability checks at one or more layers of the agent model fine-tuning pipeline, such as during training dataset intake, grader model validation, proxy-mediated tool orchestration and scanning, and/or post-training safety evaluations.

As mentioned above, the agent model fine-tuning system 206 can utilize one or more moderation models to identify and mitigate security vulnerabilities throughout the fine-tuning pipeline (as described herein). For instance, the agent model fine-tuning system 206 can detect chain-of-thought leaks within agent outputs, tool calls, and/or grader inputs (and/or evaluations). In one or more cases, a chain-of-thought leak occurs when an agent model exposes intermediate reasoning traces, internal prompts, or proprietary logic that may reveal model weights, training data, or other confidential information. The agent model fine-tuning system 206 can utilize one or more moderation models to identify reasoning artifacts indicative of such leaks.

Additionally, the agent model fine-tuning system 206 can identify disallowed instructions and/or disallowed content within training samples, agent outputs, and/or tool interactions. For instance, disallowed instructions can include prompts or directives that attempt to elicit harmful, illegal, and/or policy-violating responses from an agent model (e.g., instructions to generate malicious code or unsafe procedures). In addition, disallowed content can include text, data, content, and/or tool outputs containing subject matter from categories deemed non-compliant with safety and/or ethical standards.

Furthermore, the agent model fine-tuning system 206 can perform other security vulnerability checks targeting other risk categories, such as jailbreak attempts or preparedness-related content. For example, the agent model fine-tuning system 206 can utilize one or more moderation models to detect jailbreak attempts that involve adversarial prompt patterns designed to override model safety constraints or elicit hidden system behaviors. In addition, the agent model fine-tuning system 206 can utilize one or more moderation models to detect preparedness-related vulnerabilities, such as the generation or handling of chemical, biological, radiological, or nuclear (CBRN) information, or cybersecurity-sensitive data that could be exploited for malicious use. In some cases, the agent model fine-tuning system 206 can utilize one or more moderation models that are fine-tuned to act as biological validators and/or cyber security validators.

In one or more cases, the agent model fine-tuning system 206 can also evaluate training and inference data against red-teaming datasets. For example, high-risk red-teaming datasets can include synthetic or adversarial prompts related to dangerous topics such as weapons design, pandemic planning, or exploitation of critical infrastructure. These datasets are used to test and harden model refusal and compliance behaviors under stress conditions. Additionally, low-risk red-teaming datasets can include scenarios designed to assess model tone, moderation consistency, and/or subtle value alignment (e.g., rating offensive jokes or evaluating potentially sensitive cultural content). The agent model fine-tuning system 206 can utilize one or more moderation models to monitor performance on both high-risk and low-risk red-teaming datasets to evaluate robustness and ensure safety policies remain consistently enforced.

In one or more instances, the agent model fine-tuning system 206 utilizes flagging thresholds to determine one or more actions for security vulnerabilities. For example, as part of the security validation process, the agent model fine-tuning system 206 can remove one or more training examples that are flagged by the one or more moderation models as containing restricted content. In one or more implementations, the agent model fine-tuning system 206 applies dataset-level thresholds to determine whether the dataset should proceed or be blocked from fine-tuning. For example, if more than a predetermined proportion or count of examples (e.g., more than a threshold percent of total examples or more than a threshold number of examples) are flagged, the agent model fine-tuning system 206 can block the dataset from proceeding. Additionally, in some cases, if the number of flagged examples falls below the defined thresholds (e.g., less than a threshold percent and/or less than a threshold number of examples), the agent model fine-tuning system 206 can continue processing the dataset after removing the flagged examples. In some implementations, the agent model fine-tuning system 206 can transmit an electronic message (e.g., a notification, SMS, email) to an administrator device indicating a number of removed examples.

In one or more implementations, when the one or more moderation models flag reference answers as containing chain-of-thought (CoT)-like content, the agent model fine-tuning system 206 can remove those examples. In some cases, the agent model fine-tuning system 206 can apply additional dataset-level thresholds to determine whether fine-tuning should proceed after detecting CoT-like content. For instance, if more than a threshold percent and/or more than a threshold number of examples in a dataset are flagged for (CoT)-like content, the agent model fine-tuning system 206 can block the dataset from continuing. Moreover, if the number of flagged examples remains below the thresholds (e.g., less than a threshold percent and/or less than a threshold number of examples), the agent model fine-tuning system 206 can proceed with fine-tuning after removing the flagged data. Indeed, the agent model fine-tuning system 206 can also transmit electronic communications to an administrator device to notify of the number of removed examples flagged for (CoT)-like content.

In one or more implementations, the agent model fine-tuning system 206 can initiate each reinforcement fine-tuning job with a background verification pipeline that validates the integrity and safety of all uploaded datasets prior to training. For instance, before model fine-tuning begins, the agent model fine-tuning system 206 can retrieve each uploaded dataset file (e.g., in JSONL format) from a file management interface (e.g., a FileAPI) to verify continued availability and data consistency. The agent model fine-tuning system 206 can parse each example using a reinforcement schema that defines expected structural attributes and required fields for training prompts, responses, grader metadata, and/or reward signals. In one or more cases, if one or more dataset files fail to parse correctly or violate the schema, the agent model fine-tuning system 206 can block the training job from proceeding. Additionally, the agent model fine-tuning system 206 can log multimodal edge cases, such as examples containing non-textual media or unusual tokenization boundaries. Furthermore, the agent model fine-tuning system 206 can derive downstream hyper-parameters (e.g., batch size, reward scaling, and trajectory length) based on dataset structure and composition.

After structural validation, the agent model fine-tuning system 206 can perform a secondary safety evaluation utilizing the one or more moderation models applied to the verified dataset files. Indeed, the one or more moderation models can detect unsafe content, such as disallowed instructions, malicious payloads, and/or secret information leakage, and can terminate the fine-tuning job before the dataset is transmitted to training clusters (in accordance with one or more implementations herein). Furthermore, in some cases, the agent model fine-tuning system 206 can parse one or more JSONL line into a reinforcement example object which enforces dataset-level consistency rules, including that the final prompt terminates with a user message, disallowing multiple developer messages, banning system messages to avoid conflicting instructions, and/or verifying that tool call signatures remain consistent throughout the dataset.

As mentioned above, the agent model fine-tuning system 206 can utilize an external grader model provided by a third-party system during training, such as a user-defined grader model. For instance, FIG. 6 illustrates the agent model fine-tuning system 206 implementing grader model validation. In particular, FIG. 6 illustrates the agent model fine-tuning system 206 utilizing a third-party system hosted external grader model.

For example, as shown in FIG. 6, the agent model fine-tuning system 206 utilizes, within a training trajectory environment 600, an agent model 614 to generate moderated outputs 615 from training data 608 (in accordance with one or more implementations herein). Indeed, the agent model fine-tuning system 206 utilizes the agent model 614 to generate moderated outputs 615 by utilizing one or more moderation models (in accordance with one or more implementations herein). In addition, as shown in FIG. 6, the agent model fine-tuning system 206 utilizes the moderated outputs 615 with an external grader model 604 (hosted by a third-party system 602) to receive (or generate) generative reward(s) 610. Moreover, the agent model fine-tuning system 206, in an act 612, performs a schema validation on the received generative reward(s) 610 for security and/or safety validity prior to utilizing the generative reward(s) 610 for fine-tuning the agent model 614. In some instances, the agent model fine-tuning system 206 performs a schema validation on data from the grader model to check if the grader model safely executes and/or safely consumes meta-data and/or other inputs of the agent model fine-tuning system 206 to catch grader model bus, errors, and/or other malicious behaviors, such as unsafe network calls). Upon validating the received generative reward(s) 610, the agent model fine-tuning system 206 utilizes the generative reward(s) 610 to modify parameters of the agent model 614 (i.e., training the agent model).

Additionally, as shown in FIG. 6, the agent model fine-tuning system 206 can enforce checks on a grader model for detected changes to the external grader model (or a configuration of the external grader model). For example, as shown in FIG. 6, the agent model fine-tuning system 206 can perform an external grader model config check 616 to determine changes to the external grader model 604. In some cases, the agent model fine-tuning system 206 can perform the external grader model config check 616 by computing and comparing a configuration hash for the grader model code and/or data. Indeed, when a change is detected for the grader model, the agent model fine-tuning system 206 can re-execute grader model validation to generate updated security and/or safety vulnerability check(s) in accordance with one or more implementations herein. Furthermore, in some cases, if a grader configuration associated with a fine-tuning job is modified, the agent model fine-tuning system 206 can automatically invalidate any cached file statistics and/or prior validation results. The agent model fine-tuning system 206 can then trigger a fresh validation sequence to prevent stale or mismatched data from propagating into training.

Alternatively, in some cases, the agent model fine-tuning system 206 implements grader model validation to ensure that a user-defined grader model operates safely and reliably prior to being applied in stateful training trajectories of an agent model. For example, the agent model fine-tuning system 206 can deploy the external grader model in a sandbox environment, validate the grader model using training data and generative rewards, and enforce revalidation when the grader model changes. For instance, a third-party system can provide an external grader model (e.g., a python script, an endpoint grader, and/or model-based grader instructions or prompts) to the agent model fine-tuning system 206. Furthermore, the agent model fine-tuning system 206 can introduce the external grader model into a sandbox environment to isolate grader execution from production training resources. Within the sandbox environment, the agent model fine-tuning system 206 can provide representative training data and generative reward(s) (as signals) to evaluate the external grader model against one or more grader validation model(s). For instance, the grader validation model(s) can generate one or more grader safety/security checks that classify whether the external grader model is free of unsafe, biased, and/or malicious behaviors.

Moreover, in some cases, the agent model fine-tuning system 206 can implement endpoint grader protection mechanisms to prevent data leakage when grader models operate through customer-hosted or external endpoints. For instance, in some cases, the agent model fine-tuning system

206 can transmit agent outputs to external grader endpoints during fine-tuning and can expose sensitive customer data or proprietary logic. To mitigate this risk, the agent model fine-tuning system 206 can cause the grader endpoints to execute within isolated environments that maintain network segmentation from the training infrastructure (e.g., an environment controlled by the agent model fine-tuning system 206 and/or an environment controlled by a user of the third-party system). Furthermore, the agent model fine-tuning system 206 can utilize transport layer security (TLS) encryption (or other types of encryptions) for grader model communications to ensure confidentiality and integrity of transmitted data.

Additionally, the agent model fine-tuning system 206 can utilize application programming interface (API) schemas for interactions between the agent model fine-tuning system 206 and one or more external grader endpoints. In one or more implementations, the agent model fine-tuning system 206 can utilize API schemas to define allowable input parameters, response structures, and/or data types to restrict grader model communications to expected model outputs and/or evaluation signals.

In some cases, the agent model fine-tuning system 206 can determine whether the external grader model passes validation based on the generated grader security checks (i.e., security vulnerability checks). In one or more instances, if validation succeeds, the agent model fine-tuning system 206 admits the external grader model for utilization in evaluating agent outputs and producing reward signals during training. Moreover, if the security vulnerability checks fail, the agent model fine-tuning system 206 can reject the external grader model and terminate training of the agent model to prevent the grader model from influencing model updates. Moreover, in some cases, the agent model fine-tuning system 206 can further log the external grader model evaluation and/or notify the third-party system of rejections.

Additionally, the agent model fine-tuning system 206 can enforce revalidation of a grader model when changes are detected to the external grader model (or a configuration of the external grader model). For example, the agent model fine-tuning system 206 can perform an external grader model configuration check to determine changes to the external grader model. In some cases, the agent model fine-tuning system 206 can perform the external grader model configuration check by computing and comparing a configuration hash for the grader model code and/or data. Indeed, when a change is detected for the grader model, the agent model fine-tuning system 206 can re-execute grader model validation in the sandbox environment to generate updated security vulnerability check(s) in accordance with one or more implementations herein. Furthermore, in some cases, if a grader configuration associated with a fine-tuning job is modified, the agent model fine-tuning system 206 can automatically invalidate any cached file statistics and/or prior verification results. The agent model fine-tuning system 206 can then trigger a fresh validation sequence to rescan inputs and/or outputs of the changed grader model.

In some cases, prior to the fine-tuning job being accepted, the agent model fine-tuning system 206 can execute a pre-training validation phase in which each reinforcement example is round-tripped through the customer-defined grader (e.g., Python-based, endpoint-based, or model-based) within a controlled sandbox environment. Indeed, as described above, the agent model fine-tuning system 206 can utilize the sandboxed execution to confirm that the grader model operates as expected, safely consumes the provided metadata, and/or produces valid reward outputs compatible with the reinforcement schema. In one or more cases, the sandbox execution can detect and block grader misconfigurations, runtime errors, or unsafe behaviors, such as unauthorized network calls or code execution attempt, before any training process begins.

In one or more implementations, the agent model fine-tuning system 206 can include a reward moderation layer configured to intercept and evaluate reward signals generated during reinforcement-based fine-tuning. For instance, prior to applying reward values for model parameter updates, the agent model fine-tuning system 206 can utilize one or more moderation models to determine whether a reward signal originates from unsafe, misaligned, or adversarial grader logic. When the system identifies an unsafe reward (e.g., a reward associated with policy-violating outputs, disallowed instructions, or malicious grader behavior), the reward moderation layer can neutralize or scale the reward toward a safe baseline rather than halting training.

In some cases, the agent model fine-tuning system 206 can implement grader fuzz testing to automatically assess the robustness and safety of user-provided grader configurations prior to deployment. The agent model fine-tuning system 206 can simulate adversarial or malformed inputs against endpoint graders, Python-based graders, and/or model-based graders to detect unsafe logic patterns or reward hacking vulnerabilities. For instance, the agent model fine-tuning system 206 can analyze whether a grader incorrectly assigns positive rewards to disallowed or malicious completions, or whether grader endpoints respond unpredictably to boundary cases, such as null responses or oversized payloads. When the agent model fine-tuning system 206 detects unsafe grader behavior, the agent model fine-tuning system 206 can flag the configuration for remediation, block the fine-tuning job, and/or generate a report detailing the identified vulnerabilities.

Figure 7:
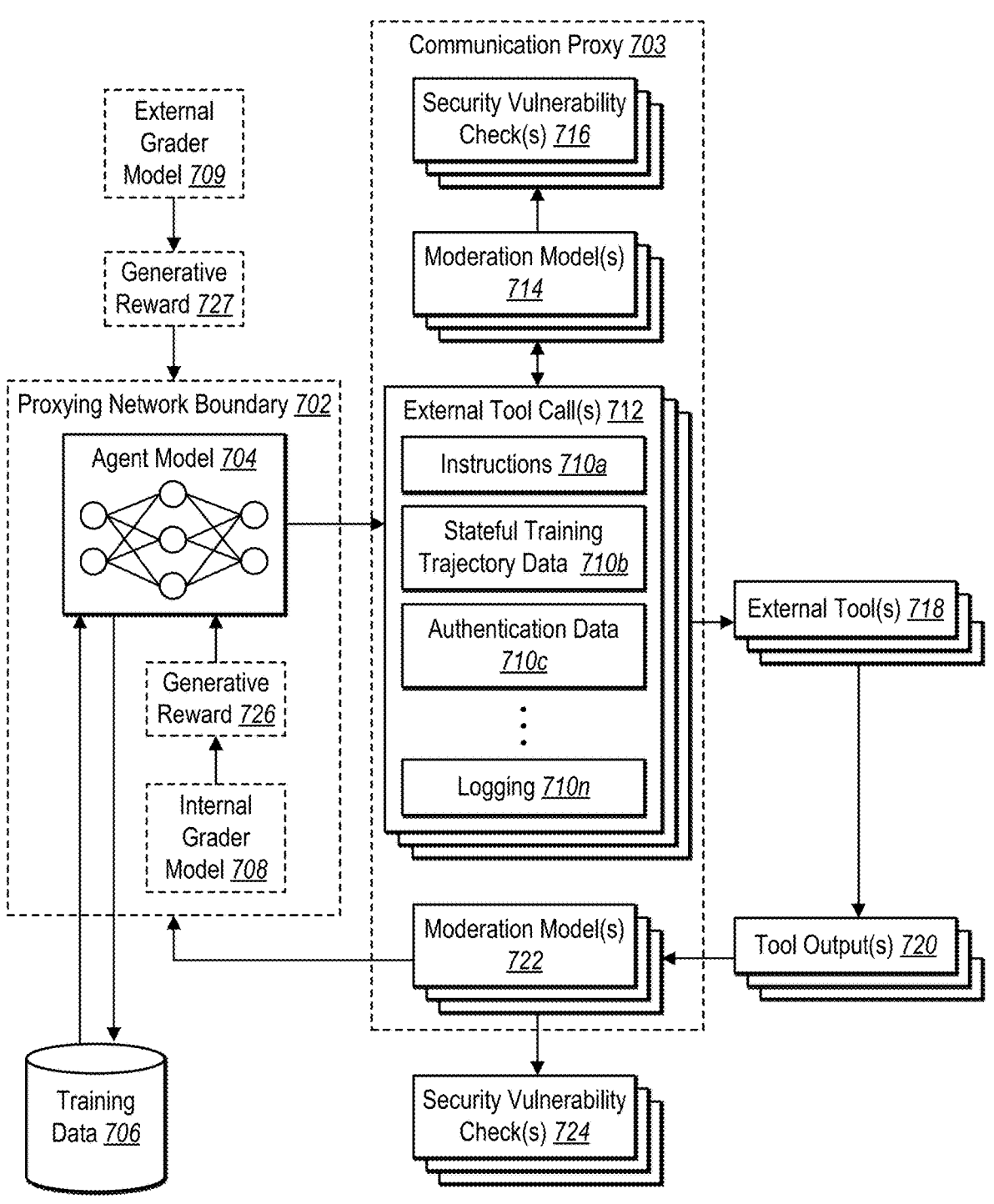
FIG. 7 illustrates an agent model fine-tuning system implementing a secure proxy architecture to enable an agent model to invoke external digital tools during training while maintaining safety and state consistency in accordance with one or more implementations.

As mentioned above, the agent model fine-tuning system 206 can implement a secure proxy architecture to enable an agent model to invoke external digital tools during training while maintaining safety and state consistency. For instance, FIG. 7 illustrates the agent model fine-tuning system 206 orchestrating proxy-mediated tool calls in a controlled training trajectory environment with moderation-based security vulnerability enforcement applied to both outbound tool calls and inbound tool outputs. In particular, FIG. 7 illustrates the agent model fine-tuning system 206 preserving the continuity of a stateful training trajectory of the agent model while enforcing boundary protections and security vulnerability enforcements against unsafe or malicious tool interactions.

For example, as shown in FIG. 7, the agent model 704 generates one or more external tool call(s) 712 while interacting with training data 706 to generate agent outputs. As shown in FIG. 7, the one or more external tool call(s) can include instructions 710a to guide and/or instruct external tool(s) 718 to perform one or more tasks and/or generate reasoning and/or responses for the instructions 710a (in accordance with one or more implementations herein). Furthermore, the one or more external tool call(s) can also include, but is not limited to, stateful training trajectory data 710b, authentication data 710c, and/or logging data 710n.

As shown in FIG. 7, the agent model fine-tuning system 206 routes the external tool call(s) through a proxying network boundary 702 and communication proxy 703 to prevent direct exposure of model weights, secrets, and/or sensitive training infrastructure to the external tool(s) 718 (or third-party systems corresponding to the tools). Indeed, the proxying network boundary 702 and communication proxy 703 can enforce network segmentation such that requests to external tools 718 are mediated by the logging data 710n, authentication data 710c, and/or stateful training trajectory data 710b to ensure that outbound tool calls remain tied to the originating trajectory identifier while concealing sensitive system details of the agent model (and/or the generative AI system 204). For example, the agent model fine-tuning system 206 can utilize the proxying network boundary 702 to facilitate communication of external tool calls and/or inbound data for the agent model 704 with a communication proxy 703. Furthermore, the communication proxy 703 can communicate the external tool calls and/or inbound data with one or more external systems (e.g., the external tool(s) 718) (e.g., by communicating with the public internet) to prevent direct exposure of model weights, secrets, and/or sensitive training infrastructure. In some cases, the agent model fine-tuning system 206 can facilitate communication between the agent model 704 and the training data 706 via the proxying network boundary 702 and the communication proxy 703.

Furthermore, as shown in FIG. 7, the agent model fine-tuning system 206 applies one or more moderation model(s) 714 to analyze the external tool call(s) 712 for security vulnerability check(s) 716, such as, but not limited to unsafe content, malicious payloads, and/or chain-of-thought leakage. Indeed, the one or more moderation model(s) 714 can generate one or more security vulnerability check(s) 716 to classify whether the tool call(s) satisfy security vulnerability conditions (or thresholds) of the agent model fine-tuning system 206. In particular, the agent model fine-tuning system 206 utilizes the generated security vulnerability check(s) 716 to detect conditions such as injection of disallowed instructions, chain-of-thought leaks, and/or requests for disallowed content that may expose weights and/or other secrets of the agent model 704 and/or destabilize the safety and/or security of the agent model 704. For example, if the security vulnerability check(s) 716 fail, the agent model fine-tuning system 206 can flag the corresponding external tool call and exclude the tool call from reward computation (or other fine tuning computations). Moreover, in some cases, the agent model fine-tuning system 206 can prevent transmittal of the external tool call(s) 712 to the external tool(s) 718 and/or terminate fine tuning of the agent model with the external tool(s) 718 when a security vulnerability is identified from the security vulnerability check(s) 716.

Furthermore, as shown in FIG. 7, the agent model fine-tuning system 206 can transmit the external tool call(s) 712 to the one or more external tool(s) 718. In response, the one or more external tool(s) 718 generate tool output(s) 720 for the agent model 704. In addition, prior to introducing the tool output(s) 720 into the agent model 704 (within the proxying network boundary 702), the agent model fine-tuning system 206 applies the one or more moderation model(s) 722 to analyze the tool output(s) 720 for security vulnerability check(s) 716, such as, but not limited to unsafe content, malicious payloads, and/or chain-of-thought mining attempts. Indeed, the one or more moderation model(s) 722 can generate one or more security vulnerability check(s) 724 to classify whether the tool output(s) 720 satisfy security vulnerability conditions (or thresholds) of the agent model fine-tuning system 206. For example, if the security vulnerability check(s) 724 fail, the agent model fine-tuning system 206 can flag the corresponding tool output and exclude the tool output from reward computation (or other fine tuning computations). In some implementations, the agent model fine-tuning system 206 can prevent ingestion of the external tool output(s) 720 into the agent model 704 and/or terminate fine tuning of the agent model with the external tool(s) 718 when a security vulnerability is identified from the security vulnerability check(s) 724.

Furthermore, the agent model fine-tuning system 206 can utilize the tool outputs, grader evaluations, and/or optional ground-truth data to compute generative rewards (e.g., generative reward 726 from an internal grader model 708 and/or generative reward 727 from an external grader model 709 as described herein) for training. In one or more instances, the grader model determines reward values based on output quality and safety compliance, which are used to optimize the agent model through reinforcement and supervised losses (e.g., RLHF, KL, and cross-entropy losses). In one or more implementations, if a training trajectory passes security and moderation checks as described herein, the agent model fine-tuning system 206 can apply the corresponding generative reward to update the agent model's fine-tuning parameters (e.g., LoRA weights layered on base weights). Indeed, the agent model fine-tuning system 206 can repeat the process across many training trajectories to gradually improve the agent model's performance on tool-augmented tasks while maintaining safety constraints enforced by the generative AI system 204 (in accordance with one or more implementations herein). In some cases, the agent model fine-tuning system 206 can facilitate communication between the agent model 704 and the external grader model 709 via the proxying network boundary 702 and the communication proxy 703.

In one or more implementations, the agent model fine-tuning system 206 can enable users to integrate custom tool servers and/or endpoint grader models through secure, access-controlled interfaces. For instance, the agent model fine-tuning system 206 can enforces that grader and tool endpoints are configured using encrypted configuration parameters and HTTPS-only URLs to ensure secure communication between external systems and the fine-tuning infrastructure. In addition, the agent model fine-tuning system 206 can utilize authorization headers and access tokens with endpoints that are encrypted at rest and/or automatically redacted from all API responses to prevent exposure or leakage through logs or network traces.

Moreover, during fine-tuning, the agent model fine-tuning system 206 can route evaluation results and/or reward signals through structured reward objects that maintain per-grader metadata, including token usage statistics, execution timing, and/pr explicit error flags (with separate counters for endpoint-based graders). Indeed, this metadata can allow tracing and auditing of external interactions associated with a fine-tuning job. In one or more cases, the agent model fine-tuning system 206 further exposes diagnostic helper functions to enable the retrieval of reports describing the external grader's returned responses and/or error conditions.

In one or more implementations, the agent model fine-tuning system 206 can perform multi-modal reinforcement operations to improve model performance across diverse training domains. For example, the agent model fine-tuning system 206 can further apply multi-modal data alignment, model checkpoint synchronization, and/or adaptive learning rate scheduling to enhance training stability and efficiency within large-scale reinforcement fine-tuning workflows. Indeed, the agent model fine-tuning system 206 can perform the above-described operations as described in VISION FINE-TUNING FOR MACHINE LEARNING AND APPLICATION PROGRAMMING INTERFACE, U.S. patent application Ser. No. 19/090,901 (filed on Mar. 26, 2025), which is hereby incorporated by reference in its entirety.

Figure 8:
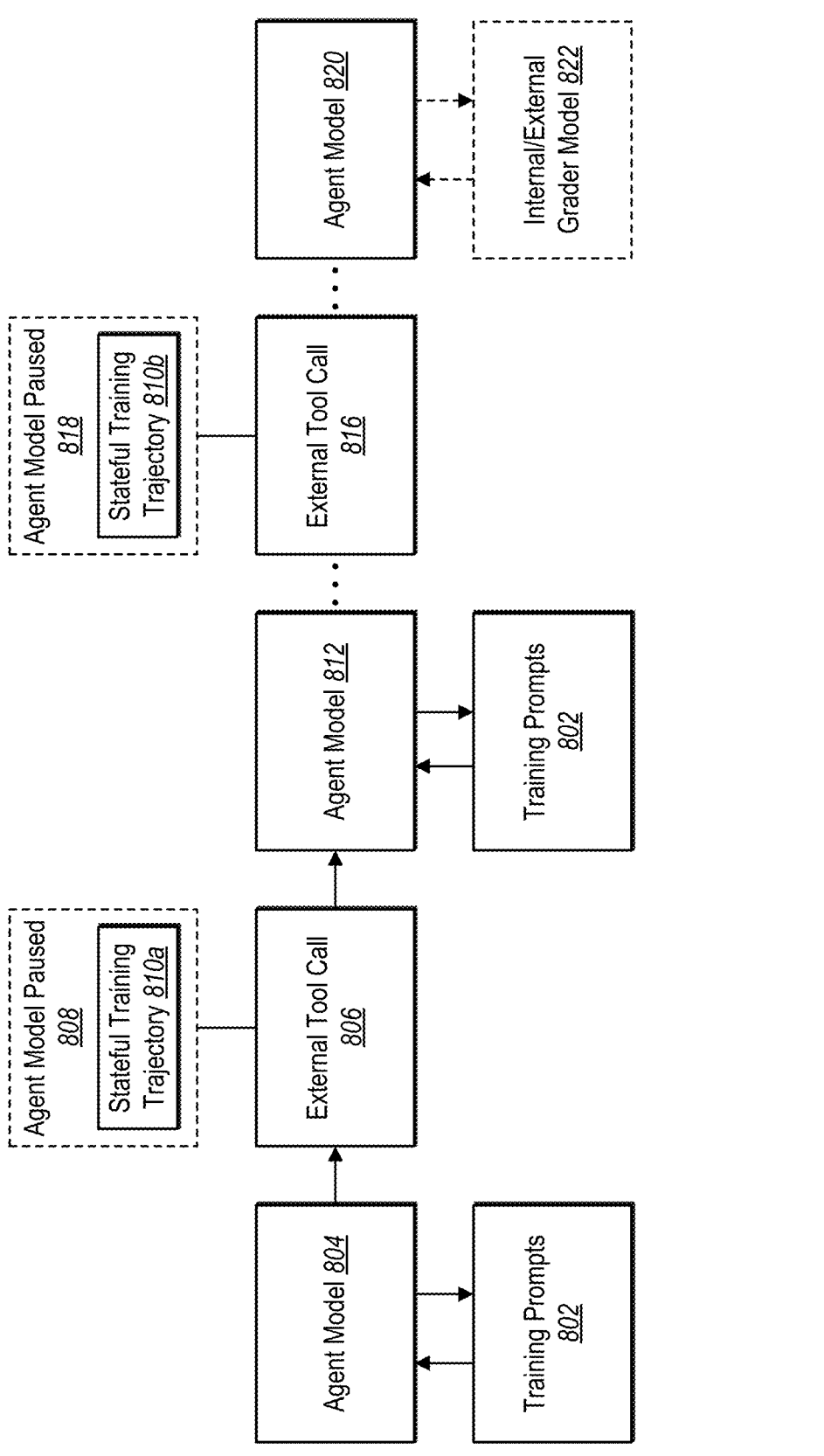
FIG. 8 illustrates an agent model fine-tuning system pausing and resuming training in response to external tool calls in accordance with one or more implementations.

Furthermore, in one or more instances, the agent model fine-tuning system 206 logs per-step reward metrics, grader errors, and tool usage statistics during reinforcement-based fine-tuning. These logs include reward values, grader inputs and/or outputs, and/or tool invocation records for each training trajectory. The agent model fine-tuning system 206 can utilize these metrics to generate automated alerts for anomalous grader behavior or irregular reward distributions and to support usage-based billing attribution across training sessions As mentioned above, the agent model fine-tuning system 206 can enable an agent model to generate multiple external tool call(s) during a single stateful training trajectory. For instance, FIG. 8 illustrates the agent model fine-tuning system 206 pausing and resuming training in response to external tool call(s) while preserving state consistency through stateful trajectory identifiers and/or stateful trajectory metadata. In particular, FIG. 8 illustrates the agent model fine-tuning system 206 operating a fine-tuning process for the agent model across generating agent outputs, transmitting external tool call(s), validating tool output(s), and/or resuming inference for training.

For example, as shown in FIG. 8, the agent model 804 generates an initial agent output in response to training prompts 802. In particular, as shown in FIG. 8, the agent output of the agent model 804 includes an external tool call 806 directed to an external digital tool. As further shown in FIG. 8, the agent model fine-tuning system 206 pauses training execution at this point (e.g., agent model paused 808) and records the current model state with a stateful training trajectory 810a to preserve consistency. During the paused state, the agent model fine-tuning system 206 can transmit the external tool call 806 to an external digital tool to generate a tool output in accordance with one or more implementations herein. Furthermore, the agent model fine-tuning system 206 can validate the tool output and/or the external tool call 806 utilizing one or more moderation model(s) to generate a security vulnerability check in accordance with one or more implementations herein.

Based on the tool output (for the external tool call 806) passing validation, the agent model fine-tuning system 206 can insert the tool output into the agent model 804 (e.g., into a context window). Furthermore, as shown in FIG. 8, the agent model 804 can resume inference as agent model 812 (with the training prompts 802) and generate a subsequent agent output that includes an external tool call 816. As shown in FIG. 8, during the external tool call 816, the agent model fine-tuning system 206 pauses training execution (e.g., agent model paused 818) and records the current model state with a stateful training trajectory 810b to preserve consistency. During the paused state, the agent model fine-tuning system 206 can transmit the external tool call 816 to an external digital tool to generate a tool output in accordance with one or more implementations herein. Indeed, the agent model fine-tuning system 206 can utilize the tool output in response to the external tool call 816 to update the context of the agent model 812 (to result in an agent model 820). Indeed, the agent model fine-tuning system 206 can repeat the above-mentioned process for each additional tool call and preserve consistency through a stateful training trajectory (as described above).

As shown in FIG. 8, the agent model fine-tuning system 206 can support multiple tool calls per training trajectory while enforcing pause-and-resume actions to ensure that tool outputs do not bypass security vulnerability checks (via moderation models) to destabilize training. Furthermore, in one or more cases, the agent model fine-tuning system 206 can log the one or more tool calls with stateful trajectory metadata, including identifiers, authentication data, and/or contextual parameters to enable auditing, reproducibility, and/or fine-grained analysis of training trajectories. In one or more cases, the agent model fine-tuning system 206 can also enforce constraints on the maximum number of tool calls per trajectory to prevent infinite loops or runaway external interactions.

As further shown in FIG. 8, the agent model fine-tuning system 206 can utilize agent model outputs with an internal and/or external grader model 822. For instance, the agent model fine-tuning system 206 can utilize the agent model outputs with an internal grader model and/or with an external grader model (after the security/safety vulnerability checks as moderated outputs) to determine generative rewards to fine-tune the agent model. In one or more instances, when the agent model fine-tuning system 206 communicates with an external grader model, the agent model fine-tuning system 206 can pause training execution and record the current model state with a stateful training trajectory to preserve consistency. In addition, the agent model fine-tuning system 206 can also provide the stateful training trajectory (or a moderated stateful training trajectory checked for safety and/or security vulnerabilities) to the external grader model for context and/or consistency. Additionally, although FIG. 8 illustrates the agent model fine-tuning system 206 communicating with the internal and/or external grader model 822 in a single time step, the agent model fine-tuning system 206 can utilize the agent model outputs with an internal grader model and/or with an external grader model (after the security/safety vulnerability checks as moderated outputs) to determine generative rewards to fine-tune the agent model at various steps of the process illustrated in FIG. 8.

Figure 9:
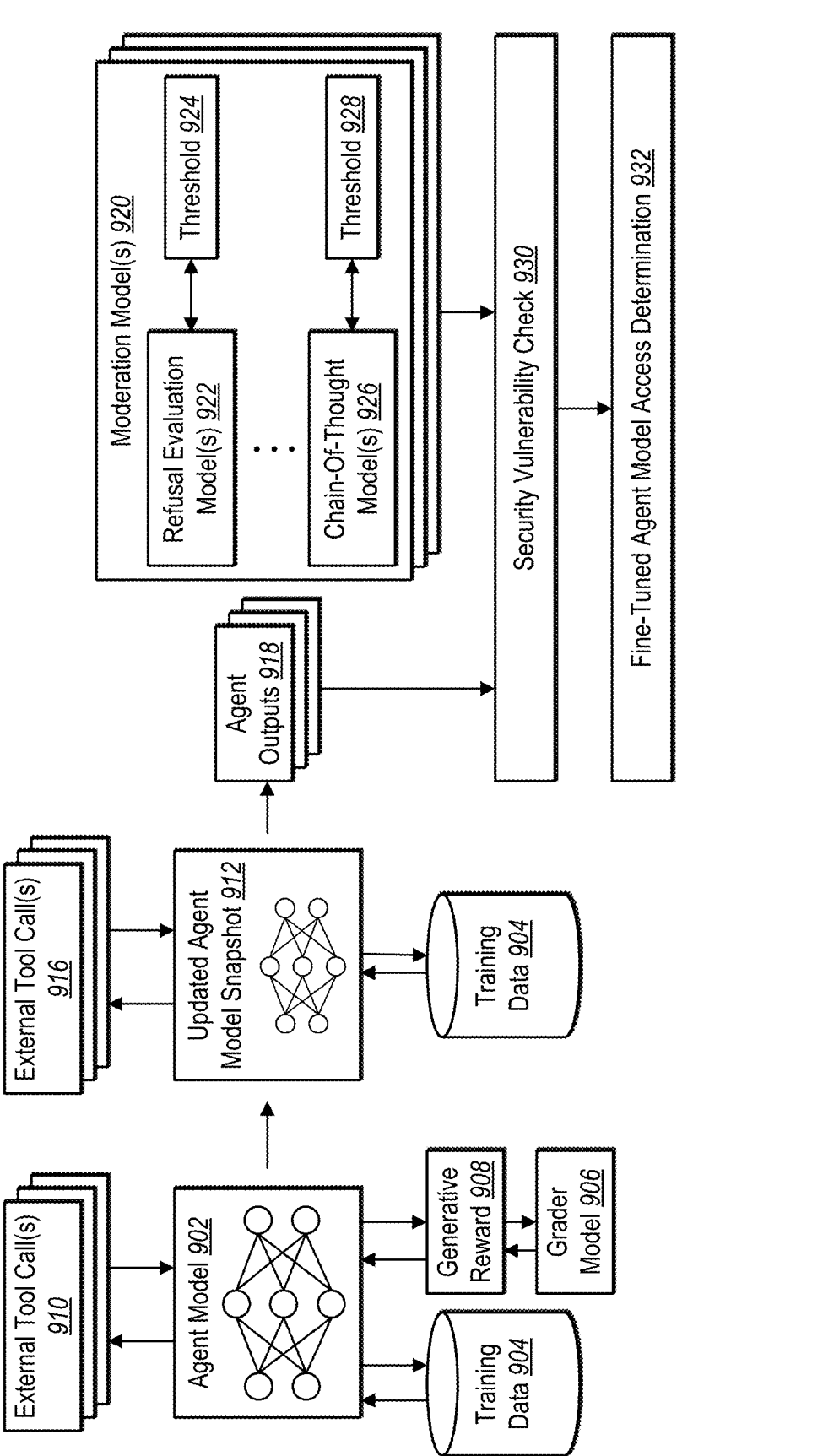
FIG. 9 illustrates an agent model fine-tuning system utilizing a post-training security validation layer in accordance with one or more implementations.

As mentioned above, the agent model fine-tuning system 206 can utilize a post-training security validation layer to verify that fine-tuned checkpoints comply with system safety and data alignment prior to exposing the fine-tuned agent model checkpoints for inference. For instance, FIG. 9 illustrates the agent model fine-tuning system 206 utilizing a post-training security validation layer to analyze stateful training trajectories, agent outputs, and training samples in order to determine security vulnerabilities prior to deployment or release of a fined-tuned agent model. In particular, FIG. 9 illustrates the agent model fine-tuning system 206 performing a second layer of security validation in which fine-tuned checkpoints are blocked or released based on the outcome of multi-layer safety evaluations (for safety regressions of the fine-tuned agent model).

As shown in FIG. 9, the agent model fine-tuning system 206 trains an agent model 902 utilizing training data 904, a grader model 906 (with a generative reward 908), and one or more external tool call(s) 910 to generate an updated agent model snapshot (i.e., a fine-tuned agent model) in accordance with one or more implementations herein. Furthermore, as shown in FIG. 9, the agent model fine-tuning system 206 utilizes the training data 904 with the updated agent model snapshot 912 to cause the updated agent model snapshot 912 to generate agent outputs 918 (from the training data 904 with one or more external tool call(s) 916 created by the updated agent model snapshot 912).

Furthermore, as shown in FIG. 9, the agent model fine-tuning system 206 applies one or more moderation model(s) 920 to the agent outputs 918 to determine a security vulnerability check 930 for the agent outputs 918. In particular, the agent model fine-tuning system 206 can utilize the one or more moderation model(s) 920 to generate one or more security vulnerability checks that classify security (and/or safety) violations, such as chain-of-thought leaks, disallowed instructions, and/or disallowed content. Moreover, the agent model fine-tuning system 206 can utilize the security vulnerability checks (e.g., a security vulnerability check 930) to determine whether portions of the agent outputs 918 are admissible or prohibited.

For example, in some cases, the agent model fine-tuning system 206 utilizes a refusal evaluation model(s) 922 to analyze whether a fine-tuned agent model (e.g., the updated agent model snapshot 912) continues to maintain refusal boundaries on unsafe content. Indeed, the refusal evaluation model(s) 922 can generate one or more security vulnerability check(s) to classify whether the fine-tuned agent model outputs remain aligned with disallowed content boundaries (e.g., rejecting outputs related to malicious use, unsafe content, privacy breaches, private model information distillation, unsafe tool invocation). For instance, if the refusal evaluation model(s) 922 determine that a refusal rate of content from the security vulnerability checks fall below a defined threshold 924, the agent model fine-tuning system 206 can flag fine-tuned checkpoint and withhold flag fine-tuned checkpoint the from release.

Furthermore, as shown in FIG. 9, the agent model fine-tuning system 206 applies a chain-of-thought (CoT) leak evaluation model(s) 926 to detect whether the fine-tuned agent model (e.g., the updated agent model snapshot 912) improperly expose intermediate reasoning traces in response to the training data (e.g., inputs of user or developer messages, tool outputs). In particular, the CoT leak evaluation model(s) 926 can generate security vulnerability check(s) to classify whether the agent outputs 918 contain reasoning artifacts, backdoor triggers, or skeleton key patterns that could compromise model integrity of the updated agent model snapshot 912. In one or more implementations, the agent model fine-tuning system 206 can block fine-tuned agent model checkpoints when a percentage of sampled training prompts result in agent outputs from the updated agent model snapshot 912 resulting in a chain-of-thought leak satisfies a threshold percentage (i.e., the threshold 928).

As shown in FIG. 9, the agent model fine-tuning system 206 can utilize the combined results of moderation model(s) 920 to generate the security vulnerability check 930. In one or more implementations, the agent model fine-tuning system 206 can utilize the security vulnerability check 930 to represent whether one or more moderation model(s) 920 identified a security vulnerability. Indeed, the agent model fine-tuning system 206 can utilize the security vulnerability check 930 to determine a fine-tuned agent model access determination 932 (e.g., approve or block the release of the updated agent model snapshot 912). For instance, when the agent outputs 918 pass the security vulnerability check 930 (e.g., the moderation model(s) 920 do not identify a security vulnerability), the agent model fine-tuning system 206 can enable access to the updated agent model snapshot 912 for inference in the generative AI system 204. Moreover, when the agent outputs 918 fails the security vulnerability check 930 (e.g., the moderation model(s) 920 identify one or more security vulnerability in accordance with one or more implementations), the agent model fine-tuning system 206 can block the checkpoint release of the updated agent model snapshot 912. In addition, the agent model fine-tuning system 206 can log the access and/or block determinations for auditing and/or notify third-party systems of the access and/or block determinations.

In some cases, the agent model fine-tuning system 206 utilizes threshold distributions from one or more moderation models to determine one or more security vulnerability checks. For instance, the agent model fine-tuning system 206 can apply safety evaluation processes to verify that fine-tuned agent models do not exhibit regressions in refusal behavior or chain-of-thought (CoT) leakage following reinforcement-based fine-tuning. For instance, the agent model fine-tuning system 206 can apply safety evaluations as part of a post-training mitigation layer that uses evaluation datasets and model-specific thresholds to ensure that model updates do not degrade safety alignment. For example, the agent model fine-tuning system 206 can execute these evaluations before authorizing inference access to a fine-tuned model checkpoint to prevent the deployment of agent models that fail to meet established safety standards.

In one or more implementations, the agent model fine-tuning system 206 can execute refusal evaluations using pre-defined test sets and corresponding moderation thresholds. For example, the agent model fine-tuning system 206 can apply one or more refusal evaluation moderation models that measure whether the fine-tuned model maintains proper safety boundaries when responding to harmful or disallowed prompts. For instance, the agent model fine-tuning system 206 can utilize thresholds established by safety infrastructure components and can dynamically adjust these thresholds based on baseline model distributions to accommodate natural variation in safety-related metrics. For instance, if a fine-tuned agent model's refusal rate or safety score falls below the established threshold for any category of evaluation, the agent model fine-tuning system 206 can automatically block the fine-tuned checkpoint from proceeding to inference.

Additionally, the agent model fine-tuning system 206 can execute chain-of-thought (CoT) leak evaluations to determine whether a fine-tuned model exhibits a propensity to expose internal reasoning traces, hidden instructions, and/or private data through its generated outputs. For example, the agent model fine-tuning system 206 can utilize one or more moderation models trained to detect CoT leakage patterns across multiple datasets, such as simulated attack benchmarks, policy override tests, and/or synthetic evaluation sets. In one or more cases, the agent model fine-tuning system 206 can aggregate results across multiple test sets and determine failure if more than (or equal to) a predefined fraction (e.g., a threshold percent) or more than a threshold number of examples are flagged for CoT leak behaviors. Indeed, if such thresholds are satisfied, the agent model fine-tuning system 206 can block the fine-tuned agent model checkpoint and prevent further access to the agent model.

Figure 10A:
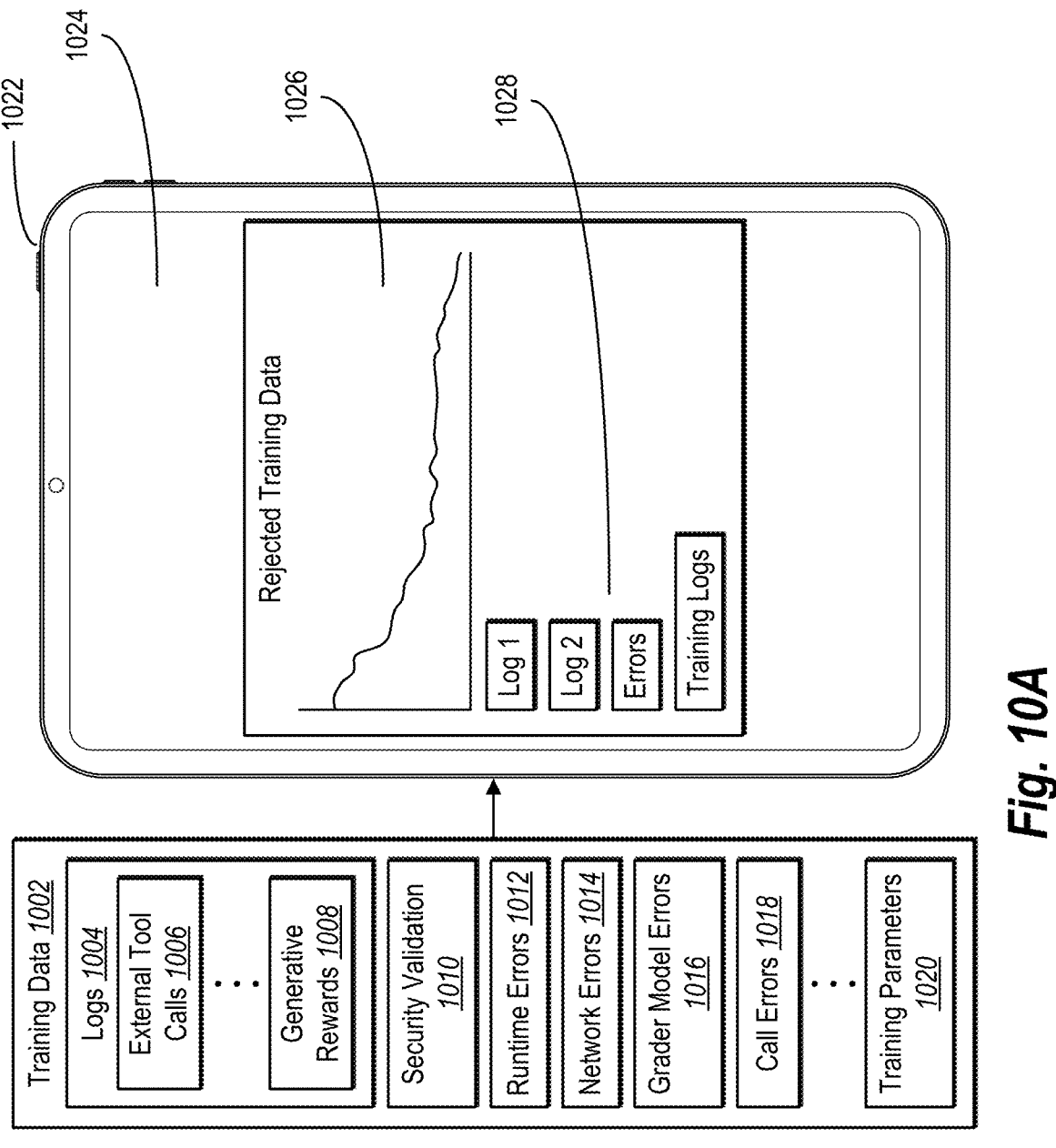

As mentioned above, the agent model fine-tuning system 206 can utilize training and security data generated during operation of the reinforcement fine-tuning pipeline and multi-layer security architecture (as described herein) to provide analytical visualizations and monitoring interfaces. For instance, FIG. 10A illustrates the agent model fine-tuning system 206 generating and displaying one or more dashboards that display aggregated training information, runtime metrics, and/or security validation results. In particular, FIG. 10A illustrates the agent model fine-tuning system 206 utilizing internal logs, validation outputs, and/or system metadata to render graphical displays of fine-tuning parameters, performance diagnostics, and/or security-related information from the reinforcement fine-tuning pipeline utilizing the multi-layer security architecture (as described herein).

For example, as shown in FIG. 10A, the agent model fine-tuning system 206 provides, for display within a graphical user interface 1024 of a client device 1022, a training overview dashboard 1026 that visualizes various data from the training data 1002. For instance, the agent model fine-tuning system 206 can utilize training data 1002 to generate and display a training overview dashboard 1026. In particular, as shown in FIG. 10A, the agent model fine-tuning system 206 can utilize training data 1002, such as, but not limited to, logs 1004 which can include external tool calls 1006, generative rewards 1008, and/or other logs (e.g., rejection logs), data from security validations 1010, runtime errors 1012, network errors 1014, grader model errors 1016, call errors 1018 (of digital tools), and/or training parameters 1020 for the display of the training overview dashboard 1026. As an example, FIG. 10A illustrates the agent model fine-tuning system 206 displaying the training overview dashboard 1026 to display rejected training data from a training iteration of an agent model (through the utilization of one or more security validation layers of the multi-layer security architecture described herein).

In addition, as shown in FIG. 10A, the agent model fine-tuning system 206 can also display, within the graphical user interface 1024, selectable options 1028 (e.g., log 1, log 2, errors, training logs) to navigate between visualized data for different aspects of the training data 1002. Indeed, the agent model fine-tuning system 206 can display selectable options for each or various combinations of the data objects from the training data 1002.

As an example, the agent model fine-tuning system 206 can display a dashboard of fine-tuning parameters and runtime conditions. In particular, the agent model fine-tuning system 206 can display a training overview dashboard with visualizations of model learning rates, reward-score distributions, batch progress, and/or tool-call frequency across stateful training trajectories. Additionally, the agent model fine-tuning system 206 can display runtime and/or network diagnostics, such as processing latency, throughput, and/or token utilization for monitoring model performance and/or efficiency during training.

Furthermore, as another example, the agent model fine-tuning system 206 can provide, for display within the graphical user interface of the client device, a security validation dashboard that presents information corresponding to security vulnerability check results. For instance, the agent model fine-tuning system 206 can display visualization panels representing the number of passed and/or failed checks for dataset filtering, grader model evaluations, proxy-mediated tool calls, and/or post-training safety evaluations (as described herein). Moreover, the agent model fine-tuning system 206 can further provide summaries of flagged training samples, unsafe tool outputs, unsafe user-defined grader models, and/or blocked checkpoints. In addition, the agent model fine-tuning system 206 can also display timelines illustrating the occurrence and resolution of each event.

Additionally, as an example, the agent model fine-tuning system 206 can provide, for display within the graphical user interface of the client device, one or more error dashboards that identify and/or categorize errors encountered during fine-tuning of an agent model. For instance, the error dashboards can include panels for runtime errors, network errors, grader model errors, and/or call errors. In some cases, the agent model fine-tuning system 206 can display annotations of metadata describing the associated stateful training trajectory and/or the affected external digital tool and/or grader model for the errors. Furthermore, the agent model fine-tuning system 206 can further provide options within the dashboard to export detailed logs and/or filter by trajectory identifier, timestamp, and/or error category.

As an example, FIG. 10B illustrates the agent model fine-tuning system 206 providing, for display within a graphical user interface 1032 of a client device 1030, a dashboard to view model outputs and corresponding data during training (e.g., traces, messages, tool call flags, metadata, tools utilized, outputs, grader evaluation values). Furthermore, in one or more cases, the agent model fine-tuning system 206 can facilitate selectable options to select a particular model output from the dashboard illustrated in FIG. 10B.

Figure 10C:
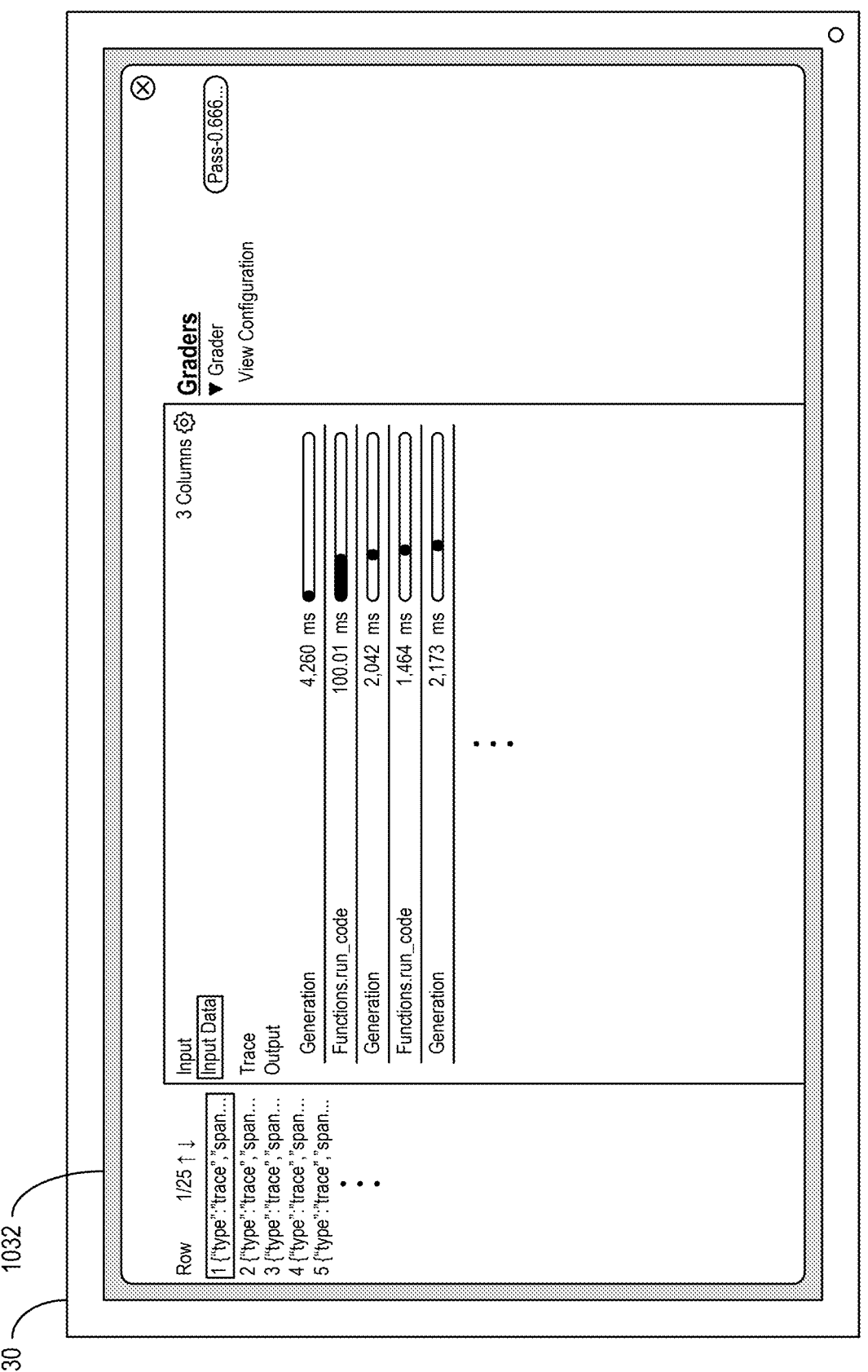

In response to selecting a model output, the agent model fine-tuning system 206, as shown in FIG. 10C, the agent model fine-tuning system 206 provides, for display within a graphical user interface 1032 of a client device 1030, model tool call data over a training trajectory for the selected model output. As shown in FIG. 10C, the agent model fine-tuning system 206 can display input data and output data that include traces and latencies for the outputs.

Figure 10D:
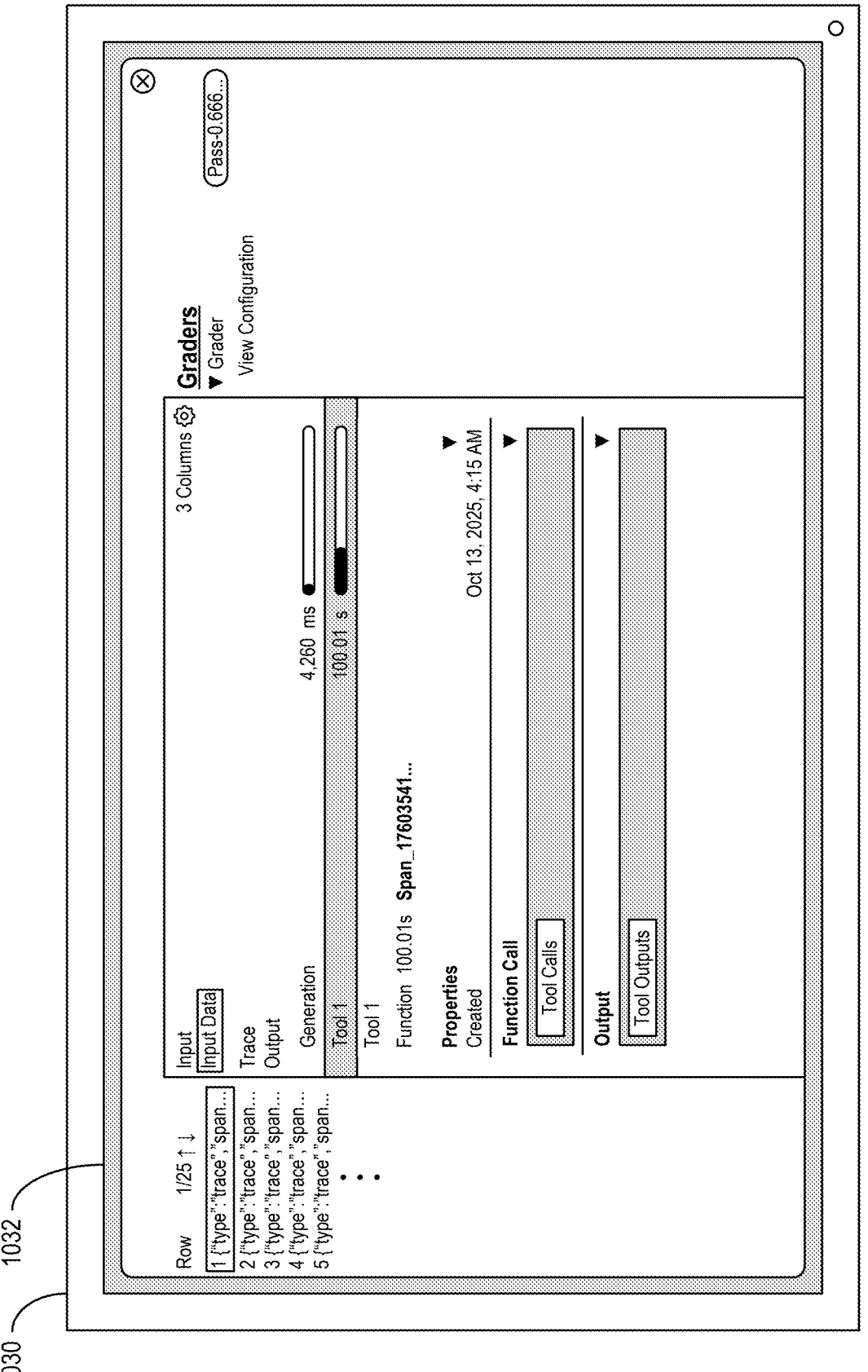

Moreover, in one or more cases, the agent model fine-tuning system 206 can facilitate selectable options to select a particular trace from the dashboard illustrated in FIG. 10C. In response to selecting a particular trace, as shown in FIG. 10D, the agent model fine-tuning system 206 provides, for display within a graphical user interface 1032 of a client device 1030, data for a particular tool call of a selected trace. For example, as shown in FIG. 10D, the agent model fine-tuning system 206 can display data, such as, a tool name, tool function, latency, properties for the tool, function calls for the tool, outputs of the tool.

Figure 10E:
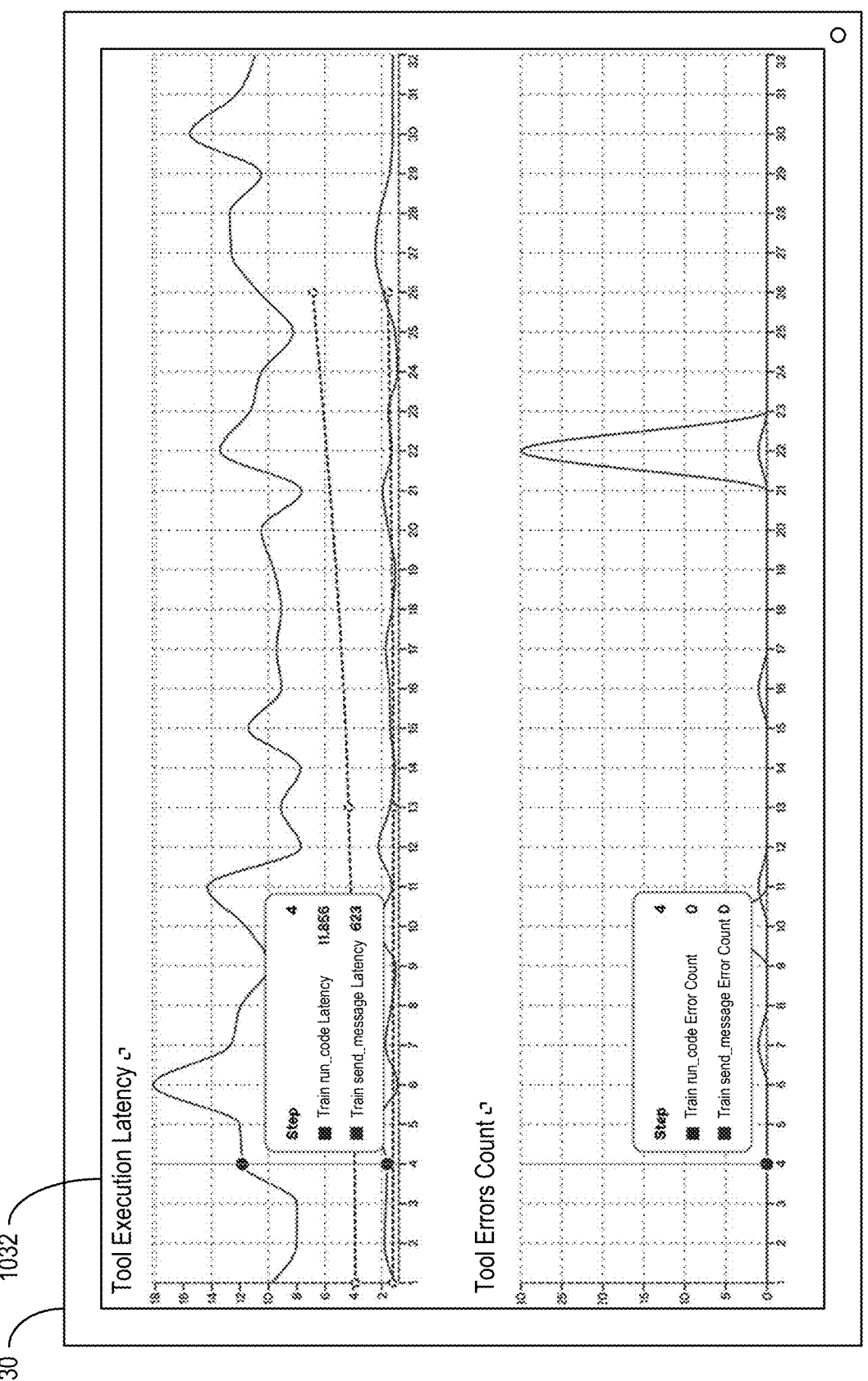

Moreover, as shown in FIG. 10E, the agent model fine-tuning system 206 provides, for display within a graphical user interface 1032 of a client device 1030, tool execution latency data and tool error counts for a training trajectory in accordance with one or more implementations herein. Although FIG. 10A-10B display particular tables and/or charts, the agent model fine-tuning system 206 can utilize various visual features and/or other features to display training data (as described herein) including, but not limited to, bar graphs, pie charts, information clouds, and/or text descriptions.

FIGS. 1-10, the corresponding text, and the examples provide several different systems and methods for utilizing a multi-layer security architecture to facilitate agent reinforcement fine-tuning of a machine learning (ML) model in accordance with one or more embodiments. In addition to the foregoing, implementations can also be described in terms of flowcharts comprising acts steps in a method for accomplishing a particular result. For example, FIG. 11 illustrates an example series of acts 1100 for utilizing a multi-layer security architecture to facilitate agent reinforcement fine-tuning of a machine learning (ML) model in accordance with one or more embodiments of the present disclosure.

Figure 11:
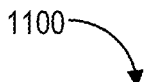
FIG. 11 illustrates an example series of acts for utilizing a multi-layer security architecture to facilitate agent reinforcement fine-tuning of a machine learning model in accordance with one or more implementations.
Figure 11:
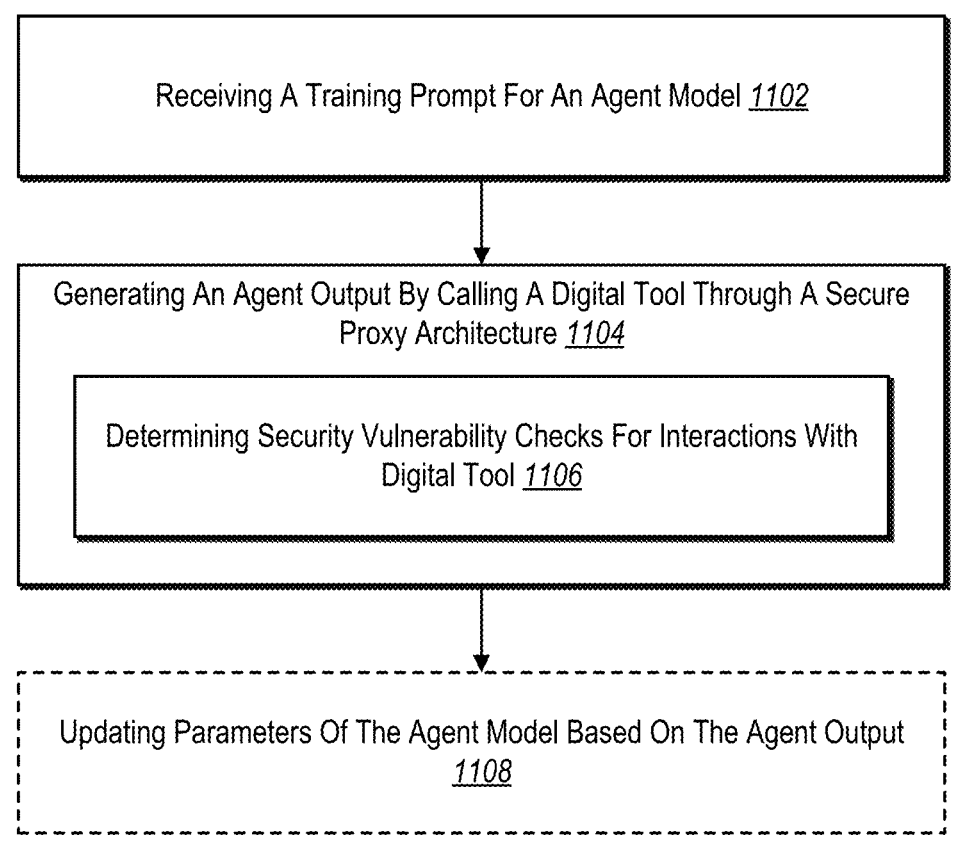

For example, as shown in FIG. 11, the series of acts 1100 includes an act 1102 of receiving a training prompt for an agent model, an act 1104 of generating an agent output by calling a digital tool through a secure proxy architecture, and an act 1106 of determining security vulnerability checks for interactions with the digital tool. In some cases, the series of acts 1100 can also include an act 1108 of updating parameters of the agent model based on the agent output.

For instance, the series of acts 1100 can include acts to perform any of the operations described in the following clauses:

Clause 1. A computer-implemented method comprising: generating, for a prompt received at a generative artificial intelligence (AI) system, a stateful training trajectory for an agent model of the generative AI system, wherein the stateful training trajectory comprises a trajectory identifier and a trajectory metadata constrained within a trajectory environment; generating, utilizing the agent model to process the prompt as part of the stateful training trajectory within the trajectory environment, an agent output by calling a digital tool through a secure proxy architecture supporting encrypted communication between the agent model and the digital tool; determining, from a grader model, a generative reward corresponding to the agent output; and updating parameters of the agent model based on the generative reward.

Clause 2. The computer-implemented method of clause 1, further comprising: calling the digital tool through the secure proxy architecture to utilize an external digital tool from a third-party system to receive a third-party tool output; and generating the agent output utilizing the agent model with the third-party tool output.

Clause 3. The computer-implemented method of clauses 1-2, further comprising utilizing one or more moderation models of the generative AI system to analyze the third-party tool output of the external digital tool for a security vulnerability of the agent model.

Clause 4. The computer-implemented method of clauses 1-3, further comprising: upon receiving the third-party tool output, calling, through the secure proxy architecture, an additional external digital tool from the third-party system to receive an additional third-party tool output; utilizing the one or more moderation models of the generative AI system to analyze the additional third-party tool output of the additional external digital tool for an additional security vulnerability of the agent model; and generating the agent output utilizing the agent model with the third-party tool output and the additional third-party tool output.

Clause 5. The computer-implemented method of clauses 1-4, further comprising utilizing one or more moderation models of the generative AI system to analyze a call to the external digital tool for a security vulnerability of the agent model, wherein the security vulnerability comprises a chain-of-thought leak.

Clause 6. The computer-implemented method of clauses 1-5, further comprising determining, from the grader model, the generative reward by utilizing an external grader model from a third-party system.

Clause 7. The computer-implemented method of clauses 1-6, further comprising, at each external grader model configuration variation, validating the external grader model within the trajectory environment by utilizing a chain-of-thought (CoT) classifier model (or by utilizing a set of training samples corresponding to the prompt with the external grader model in a sandbox environment with a chain-of-thought (CoT) classifier model).

Clause 8. The computer-implemented method of clauses 1-7, further comprising: generating an updated agent model snapshot by updating the parameters of the agent model; generating a final agent output utilizing the updated agent model snapshot with the prompt; and utilizing one or more moderation models of the generative AI system to analyze the final agent output for a security vulnerability of the updated agent model snapshot, wherein the security vulnerability comprises a chain-of-thought leak or a prohibited content item.

Clause 9. The computer-implemented method of clauses 1-8, further comprising providing access to the updated agent model snapshot to a third-party system corresponding to the prompt based the agent output lacking the security vulnerability.

Clause 10. The computer-implemented method of clauses 1-9, further comprising utilizing the stateful training trajectory to fine tune the agent model over multiple training trajectories comprising calls to one or more external digital tools.

Clause 11. A system comprising: at least one processor; and a non-transitory computer readable medium comprising instructions that, when executed by the at least one processor, cause the system to: receive a training prompt for an agent model of a generative artificial intelligence (AI) system from a user of a third-party system; receive a third-party tool output by utilizing the training prompt with the agent model to call an external digital tool through a secure proxy architecture; determine a security vulnerability check for the third-party tool output utilizing one or more moderation models of the generative AI system; based on the security vulnerability check indicating a passed third-party tool output: generate, utilizing the agent model, an agent output based on the third-party tool output; update parameters of the agent model based on a generative reward corresponding to the agent output to generate an updated agent model snapshot; and provide, to the user, access to the updated agent model snapshot.

Clause 12. The system of claim of 11, further comprising instructions that, when executed by the at least one processor, cause the system to determine the generative reward from an external grader model from the third-party system.

Clause 13. The system of clauses 11-12, further comprising instructions that, when executed by the at least one processor, cause the system to provide, for display within a graphical user interface of a client device, aggregated training information, runtime metrics, or security validation results for the agent model.

Clause 14. The system of clauses 11-13, further comprising instructions that, when executed by the at least one processor, cause the system to utilize the one or more moderation models of the generative AI system to analyze the call to the external digital tool for a security vulnerability of the agent model, wherein the security vulnerability comprises a chain-of-thought leak.

Clause 15. The system of clauses 11-14, further comprising instructions that, when executed by the at least one processor, cause the system to: generating a final agent output utilizing the updated agent model snapshot with the training prompt; utilizing one or more moderation models of the generative AI system to analyze the final agent output for a security vulnerability of the updated agent model snapshot, wherein the security vulnerability comprises a chain-of-thought leak or a prohibited content item; and provide access to the updated agent model snapshot based on the agent output lacking the security vulnerability.

Clause 16. A non-transitory computer-readable medium storing instructions that, when executed by at least one processor, cause the at least one processor to: receive a training prompt for an agent model of a generative artificial intelligence (AI) system from a user from a third-party system; receive a third-party tool output by utilizing the training prompt with the agent model to call an external digital tool through a secure proxy architecture; determine a security vulnerability check for the third-party tool output utilizing one or more moderation models of the generative AI system; and selectively fine tune parameters of the agent model utilizing the third-party tool output based on the security vulnerability check of the third-party tool output.

Clause 17. The non-transitory computer-readable medium of clause 16, further comprising instructions that, when executed by the at least one processor, cause the at least one processor to: determine a passed third-party tool output for the security vulnerability check by utilizing the one or more moderation models of the generative AI system to analyze the third-party tool output of the external digital tool to identify a lack of a security vulnerability for the agent model; and in response to the passed third-party tool output, selectively fine tune parameters of the agent model by modifying the parameters of the agent model based on the third-party tool output.

Clause 18. The non-transitory computer-readable medium of clauses 16-17, further comprising instructions that, when executed by the at least one processor, cause the at least one processor to: generate, utilizing the agent model, an agent output based on the third-party tool output; update parameters of the agent model based on a generative reward corresponding to the agent output to generate an updated agent model snapshot; and provide, to the user, access to the updated agent model snapshot.

Clause 19. The non-transitory computer-readable medium of clauses 16-18, further comprising instructions that, when executed by the at least one processor, cause the at least one processor to: determine a failed third-party tool output for the security vulnerability check by utilizing the one or more moderation models of the generative AI system to analyze the third-party tool output of the external digital tool to identify a security vulnerability for the agent model; and in response to the passed third-party tool output, selectively fine tune parameters of the agent model by terminating training of the agent model.

Clause 20. The non-transitory computer-readable medium of clauses 16-19, further comprising instructions that, when executed by the at least one processor, cause the at least one processor to utilize the one or more moderation models of the generative AI system to analyze the call to the external digital tool for a security vulnerability of the agent model.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media. Non-transitory computer-readable storage media (devices) includes RAM, ROM, EEPROM, solid state drives ("SSDs") (e.g., based on RAM), Flash memory, phase-change memory ("PCM"), or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network computers, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
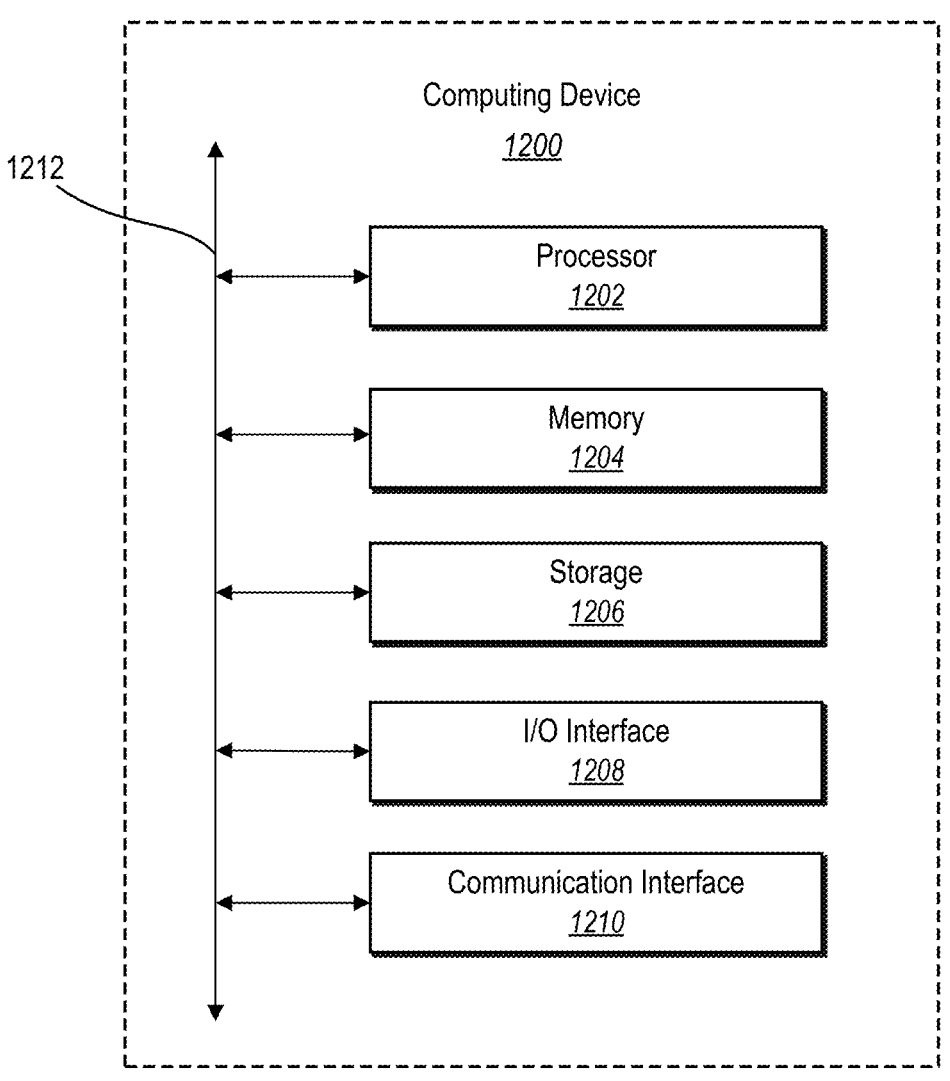
FIG. 12 illustrates a block diagram of an exemplary computing device in accordance with one or more implementations.

FIG. 12 illustrates a block diagram of exemplary computing device 1200 (e.g., the server device(s) 202, the client device 210, and/or the third-party system 214) that may be configured to perform one or more of the processes described above. One will appreciate that server device(s) 202, the client device 210, and/or the third-party system 214 may comprise one or more computing devices such as computing device 1200. As shown by FIG. 12, computing device 1200 can comprise processor 1202, memory 1204, storage device 1206, I/O interface 1208, and communication interface 1210, which may be communicatively coupled by way of communication infrastructure 1212. While an exemplary computing device 1200 is shown in FIG. 12, the components illustrated in FIG. 12 are not intended to be limiting. Additional or alternative components may be used in other implementations. Furthermore, in certain implementations, computing device 1200 can include fewer components than those shown in FIG. 12. Components of computing device 1200 shown in FIG. 12 will now be described in additional detail.

In particular implementations, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage device 1206 and decode and execute them. In particular implementations, processor 1202 may include one or more internal caches for data, instructions, or addresses. As an example and not by way of limitation, processor 1202 may include one or more instruction caches, one or more data caches, and one or more translation lookaside buffers (TLBs). Instructions in the instruction caches may be copies of instructions in memory 1204 or storage device 1206.

Memory 1204 may be used for storing data, metadata, and programs for execution by the processor(s). Memory 1204 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 1204 may be internal or distributed memory.

Storage device 1206 includes storage for storing data or instructions. As an example and not by way of limitation, storage device 1206 can comprise a non-transitory storage medium described above. Storage device 1206 may include a hard disk drive (HDD), a floppy disk drive, flash memory, an optical disc, a magneto-optical disc, magnetic tape, or a Universal Serial Bus (USB) drive or a combination of two or more of these. Storage device 1206 may include removable or non-removable (or fixed) media, where appropriate. Storage device 1206 may be internal or external to computing device 1200. In particular implementations, storage device 1206 is non-volatile, solid-state memory. In other implementations, Storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1208 allows a user to provide input to receive output from, and otherwise transfer data to and receive data from computing device 1200. I/O interface 1208 may include a mouse, a keypad or a keyboard, a touch screen, a camera, an optical scanner, network interface, modem, other known I/O devices or a combination of such I/O interfaces. I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1208 is configured to provide graphical data to a display for presentation to a user. The graphical data may be representative of one or more graphical user interfaces and/or any other graphical content as may serve a particular implementation.

Communication interface 1210 can include hardware, software, or both. In any event, communication interface 1210 can provide one or more interfaces for communication (such as, for example, packet-based communication) between computing device 1200 and one or more other computing devices or networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1210 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1210 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1212 may include hardware, software, or both that couples components of computing device 1200 to each other. As an example and not by way of limitation, communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 13:
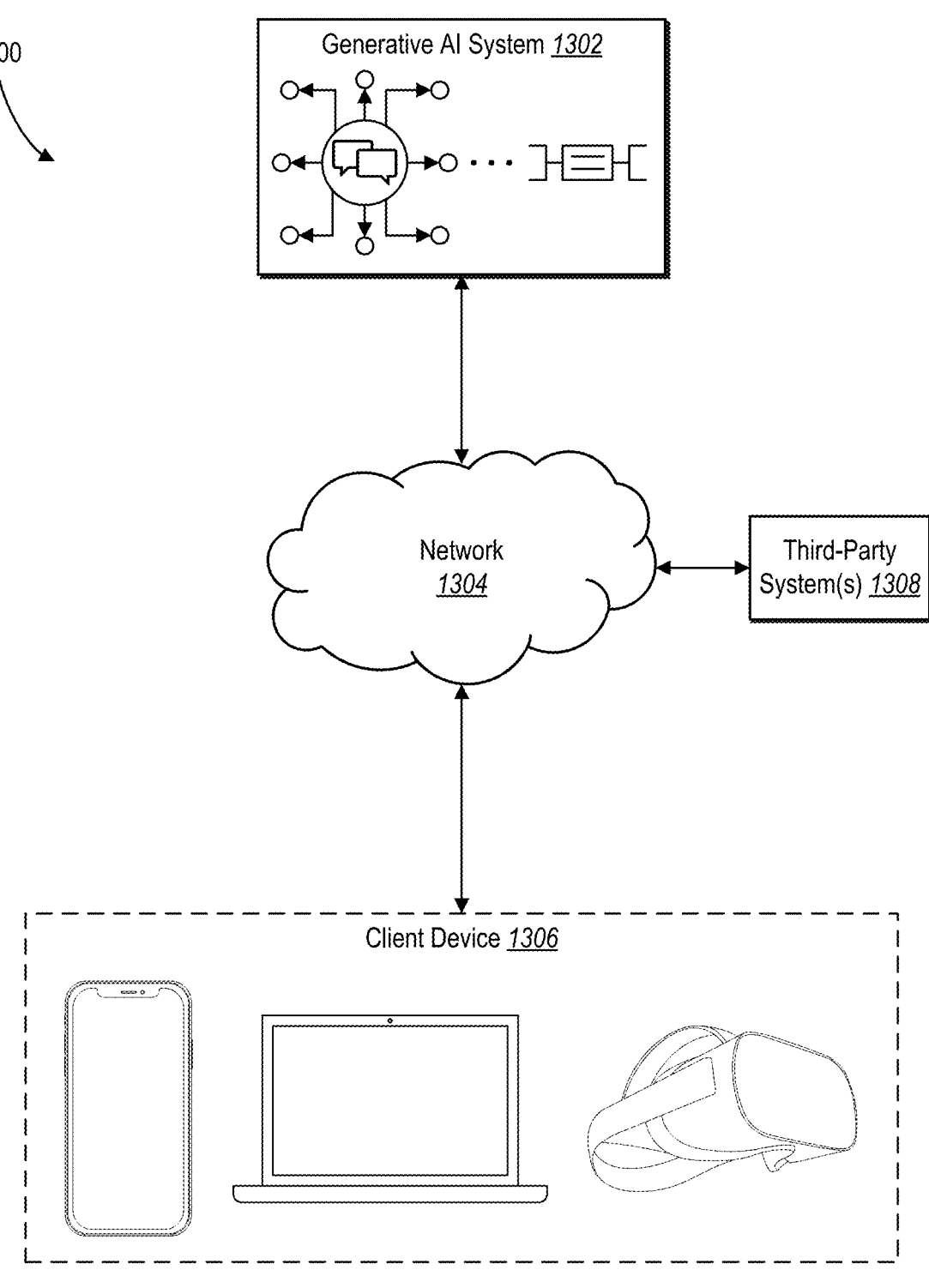
FIG. 13 illustrates a networking environment of a generative AI system in accordance with one or more implementations.

FIG. 13 is a schematic diagram illustrating environment 1300 within which one or more implementations of the agent model fine-tuning system 206 can be implemented. For example, the agent model fine-tuning system 206 may be part of a generative AI system 1302 (e.g., the generative AI system 100 or the generative AI system 204). Generative AI system 1302 may generate, store, manage, receive, and send digital content (such as digital content items). For example, generative AI system 1302 may send and receive digital content to and from client devices 1306 by way of network 1304. In particular, generative AI system 1302 can store and manage a collection of digital content. Generative AI system 1302 can manage the sharing of digital content between computing devices associated with a plurality of users. For instance, generative AI system 1302 can facilitate a user sharing a digital content with another user of generative AI system 1302.

In particular, generative AI system 1302 can manage synchronizing digital content across multiple client devices 1306 associated with one or more users. For example, a user may edit digital content using client device 1306. The generative AI system 1302 can cause client device 1306 to send the edited digital content to generative AI system 1302. Generative AI system 1302 then synchronizes the edited digital content on one or more additional computing devices.

In addition to synchronizing digital content across multiple devices, one or more implementations of generative AI system 1302 can provide an efficient storage option for users that have large collections of digital content. For example, generative AI system 1302 can store a collection of digital content on generative AI system 1302, while the client device 1306 only stores reduced-sized versions of the digital content. A user can navigate and browse the reduced-sized versions (e.g., a thumbnail of a digital image) of the digital content on client device 1306. In particular, one way in which a user can experience digital content is to browse the reduced-sized versions of the digital content on client device 1306.

Another way in which a user can experience digital content is to select a reduced-size version of digital content to request the full- or high-resolution version of digital content from generative AI system 1302. In particular, upon a user selecting a reduced-sized version of digital content, client device 1306 sends a request to generative AI system 1302 requesting the digital content associated with the reduced-sized version of the digital content. Generative AI system 1302 can respond to the request by sending the digital content to client device 1306. Client device 1306, upon receiving the digital content, can then present the digital content to the user. In this way, a user can have access to large collections of digital content while minimizing the amount of resources used on client device 1306.

Client device 1306 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1306 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1304.

Network 1304 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1306 may access generative AI system 1302.

As illustrated, the generative AI system 1302 communicates with third-party system(s) 1308 by way of the network 1304. For example, the generative AI system 1302 generates computer code or scripts for execution by the third-party system(s) 1308 as part of generating an output. In some cases, the generative AI system 1302 integrates subcomponents or features of the third-party system(s) 1308 using APIs or other integrations. The third-party system(s) 1308 can include systems housed and operated on servers separate from the generative AI system 1302, such as data management systems, calendaring systems, social networking systems, search engine systems, and/or computer other systems.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating, for a prompt received at a generative artificial intelligence (AI) system, a stateful training trajectory for an agent model of the generative AI system, wherein the stateful training trajectory comprises a trajectory identifier and a trajectory metadata constrained within a trajectory environment;
generating, utilizing the agent model to process the prompt as part of the stateful training trajectory within the trajectory environment, an agent output by calling a digital tool through a secure proxy architecture supporting encrypted communication between the agent model and the digital tool, the secure proxy architecture comprising:
one or more training clusters on which the agent model executes; and
a unified cluster boundary, separate from the one or more training clusters, configured to receive tool-call requests from the one or more training clusters and to communicate with an external endpoint of the digital tool based on the tool-call requests;
determining, from a grader model, a generative reward corresponding to the agent output; and
updating parameters of the agent model based on the generative reward.

2. The computer-implemented method of claim 1, further comprising:
calling the digital tool through the secure proxy architecture to utilize an external digital tool from a third-party system to receive a third-party tool output; and
generating the agent output utilizing the agent model with the third-party tool output.

3. The computer-implemented method of claim 2, further comprising utilizing one or more moderation models of the generative AI system to analyze the third-party tool output of the external digital tool for a security vulnerability of the agent model.

4. The computer-implemented method of claim 3, further comprising:
upon receiving the third-party tool output, calling, through the secure proxy architecture, an additional external digital tool from the third-party system to receive an additional third-party tool output;

utilizing the one or more moderation models of the generative AI system to analyze the additional third-party tool output of the additional external digital tool for an additional security vulnerability of the agent model; and generating the agent output utilizing the agent model with the third-party tool output and the additional third-party tool output.

5. The computer-implemented method of claim 2, further comprising utilizing one or more moderation models of the generative AI system to analyze a call to the external digital tool for a security vulnerability of the agent model, wherein the security vulnerability comprises a chain-of-thought leak.

6. The computer-implemented method of claim 1, further comprising determining, from the grader model, the generative reward by utilizing an external grader model from a third-party system.

7. The computer-implemented method of claim 6, further comprising, at each external grader model configuration variation, validating the external grader model within the trajectory environment by utilizing a chain-of-thought (CoT) classifier model.

8. The computer-implemented method of claim 1, further comprising:

generating an updated agent model snapshot by updating the parameters of the agent model;

generating a final agent output utilizing the updated agent model snapshot with the prompt; and utilizing one or more moderation models of the generative AI system to analyze the final agent output for a security vulnerability of the updated agent model snapshot, wherein the security vulnerability comprises a chain-of-thought leak or a prohibited content item.

9. The computer-implemented method of claim 8, further comprising providing access to the updated agent model snapshot to a third-party system corresponding to the prompt based the agent output lacking the security vulnerability.

10. The computer-implemented method of claim 1, further comprising utilizing the stateful training trajectory to fine tune the agent model over multiple training trajectories comprising calls to one or more external digital tools.

11. A system comprising:

at least one processor; and a non-transitory computer readable medium comprising instructions that, when executed by the at least one processor, cause the system to:

receive a training prompt for an agent model of a generative artificial intelligence (AI) system from a user of a third-party system;

receive a third-party tool output by utilizing the training prompt with the agent model to call an external digital tool through a secure proxy architecture comprising:

one or more training clusters on which the agent model executes; and a unified cluster boundary, separate from the one or more training clusters, configured to receive tool-call requests from the one or more training clusters and to communicate with an external endpoint of the external digital tool based on the tool-call requests;

determine a security vulnerability check for the third-party tool output utilizing one or more moderation models of the generative AI system; and based on the security vulnerability check indicating a passed third-party tool output:

generate, utilizing the agent model, an agent output based on the third-party tool output;

update parameters of the agent model based on a generative reward corresponding to the agent output to generate an updated agent model snapshot; and provide, to the user, access to the updated agent model snapshot.

12. The system of claim of 11, further comprising instructions that, when executed by the at least one processor, cause the system to determine the generative reward from an external grader model from the third-party system.

13. The system of claim 11, further comprising instructions that, when executed by the at least one processor, cause the system to provide, for display within a graphical user interface of a client device, aggregated training information, runtime metrics, or security validation results for the agent model.

14. The system of claim of 11, further comprising instructions that, when executed by the at least one processor, cause the system to utilize the one or more moderation models of the generative AI system to analyze the call to the external digital tool for a security vulnerability of the agent model, wherein the security vulnerability comprises a chain-of-thought leak.

15. The system of claim of 11, further comprising instructions that, when executed by the at least one processor, cause the system to:

generating a final agent output utilizing the updated agent model snapshot with the training prompt;

utilizing one or more moderation models of the generative AI system to analyze the final agent output for a security vulnerability of the updated agent model snapshot, wherein the security vulnerability comprises a chain-of-thought leak or a prohibited content item; and provide access to the updated agent model snapshot based on the agent output lacking the security vulnerability.

16. A non-transitory computer-readable medium storing instructions that, when executed by at least one processor, cause the at least one processor to:

receive a training prompt for an agent model of a generative artificial intelligence (AI) system from a user from a third-party system;

receive a third-party tool output by utilizing the training prompt with the agent model to call an external digital tool through a secure proxy architecture comprising:

one or more training clusters on which the agent model executes; and a unified cluster boundary, separate from the one or more training clusters, configured to receive tool-call requests from the one or more training clusters and to communicate with an external endpoint of the external digital tool based on the tool-call requests;

determine a security vulnerability check for the third-party tool output utilizing one or more moderation models of the generative AI system; and selectively fine tune parameters of the agent model utilizing the third-party tool output based on the security vulnerability check of the third-party tool output.

17. The non-transitory computer-readable medium of claim 16, further comprising instructions that, when executed by the at least one processor, cause the at least one processor to:

determine a passed third-party tool output for the security vulnerability check by utilizing the one or more moderation models of the generative AI system to analyze the third-party tool output of the external digital tool to identify a lack of a security vulnerability for the agent model; and in response to the passed third-party tool output, selectively fine tune parameters of the agent model by modifying the parameters of the agent model based on the third-party tool output.

18. The non-transitory computer-readable medium of claim 17, further comprising instructions that, when executed by the at least one processor, cause the at least one processor to:

generate, utilizing the agent model, an agent output based on the third-party tool output;

update parameters of the agent model based on a generative reward corresponding to the agent output to generate an updated agent model snapshot; and provide, to the user, access to the updated agent model snapshot.

19. The non-transitory computer-readable medium of claim 16, further comprising instructions that, when executed by the at least one processor, cause the at least one processor to:

determine a failed third-party tool output for the security vulnerability check by utilizing the one or more moderation models of the generative AI system to analyze the third-party tool output of the external digital tool to identify a security vulnerability for the agent model; and in response to the passed third-party tool output, selectively fine tune parameters of the agent model by terminating training of the agent model.

20. The non-transitory computer-readable medium of claim 16, further comprising instructions that, when executed by the at least one processor, cause the at least one processor to utilize the one or more moderation models of the generative AI system to analyze the call to the external digital tool for a security vulnerability of the agent model.

\* \* \* \* \*